United States Patent
Kriener

(10) Patent No.: US 11,873,195 B2
(45) Date of Patent: Jan. 16, 2024

(54) METHODS AND SYSTEMS FOR GENERATING LANDING SOLUTIONS FOR CONTAINERS ON LANDING SURFACES

(71) Applicant: TMEIC Corporation, Roanoke, VA (US)

(72) Inventor: Robert Charles Kriener, Roanoke, VA (US)

(73) Assignee: TMEIC Corporation, Roanoke, VA (US)

( * ) Notice: Subject to any disclaimer, the term of this patent is extended or adjusted under 35 U.S.C. 154(b) by 337 days.

(21) Appl. No.: 16/766,220

(22) PCT Filed: Nov. 23, 2018

(86) PCT No.: PCT/US2018/062394
§ 371 (c)(1),
(2) Date: May 21, 2020

(87) PCT Pub. No.: WO2019/104251
PCT Pub. Date: May 31, 2019

(65) Prior Publication Data
US 2020/0369493 A1    Nov. 26, 2020

Related U.S. Application Data

(60) Provisional application No. 62/626,990, filed on Feb. 6, 2018, provisional application No. 62/590,443, filed on Nov. 24, 2017.

(51) Int. Cl.
*G06T 7/73* (2017.01)
*B66C 13/46* (2006.01)
*G06T 7/66* (2017.01)

(52) U.S. Cl.
CPC ............... *B66C 13/46* (2013.01); *G06T 7/66* (2017.01); *G06T 7/74* (2017.01);
(Continued)

(58) Field of Classification Search
None
See application file for complete search history.

(56) References Cited

U.S. PATENT DOCUMENTS

| 5,661,465 A | 8/1997 | Hung et al. |
| 7,123,132 B2 | 10/2006 | Heidenback et al. |

(Continued)

FOREIGN PATENT DOCUMENTS

| DE | 3606363 C2 | 4/1995 |
| DE | 102007055316 A1 | 2/2009 |

(Continued)

OTHER PUBLICATIONS

Besl PJ, McKay ND. Method for registration of 3-D shapes. InSensor fusion IV: control paradigms and data structures Apr. 30, 1992 (vol. 1611, pp. 586-606). Spie. (Year: 1992).*

(Continued)

*Primary Examiner* — Steven Z Elbinger
(74) *Attorney, Agent, or Firm* — New River Valley IP Law, P.C.; Michele L. Mayberry

(57) ABSTRACT

Systems and methods of generating landing solutions for containers onto landing surfaces using multiple measurement points generated by a measuring device or multiple measuring devices are described. In particular, methods of analyzing the plurality of measurement and from the analysis of the data, determining the location and orientation, in the container handling equipment's frame of reference, of where to place a shipping container onto a landing surface present within the equipment's workspace are described. This location can then be used by the equipment's automation system to automatically place the shipping container onto the landing surface without the need for human input, or relatively little human interaction or input. The systems and methods are applicable to operating in a landside transfer zone as well as outside such zone, and as such would (Continued)

be applicable to install on any container handling equipment which can land containers on equipment from above.

10 Claims, 39 Drawing Sheets

(52) U.S. Cl.
CPC .............. *G06T 2207/10028* (2013.01); *G06T 2207/20084* (2013.01); *G06T 2207/30108* (2013.01)

(56) References Cited

U.S. PATENT DOCUMENTS

| | | | |
|---|---|---|---|
| 7,725,287 | B2 | 5/2010 | Stocker |
| 8,686,868 | B2 | 4/2014 | Stocker et al. |
| 9,260,276 | B2 | 2/2016 | Stocker et al. |
| 2009/0030647 | A1 | 1/2009 | Stocker |
| 2010/0320727 | A1* | 12/2010 | Haut ............... B62D 21/20 280/423.1 |
| 2012/0089320 | A1 | 4/2012 | Tan et al. |
| 2012/0283868 | A1* | 11/2012 | Rutt ............... G06Q 10/083 700/214 |
| 2013/0147640 | A1 | 6/2013 | Stocker |
| 2014/0225751 | A1 | 8/2014 | Stocker et al. |
| 2017/0251143 | A1* | 8/2017 | Peruch ............ H04N 5/23293 |
| 2018/0282132 | A1* | 10/2018 | Laitasalmi ........ B66C 13/46 |

FOREIGN PATENT DOCUMENTS

| | | | | |
|---|---|---|---|---|
| DE | 102008014125 | A1 | 2/2009 | |
| DE | 102009060513 | A1 | 6/2011 | |
| EP | 1057719 | A2 * | 12/2000 | ............ B60P 1/6481 |
| EP | 1728709 | A2 * | 12/2006 | ............ B60P 1/6481 |
| EP | 1964806 | A1 | 9/2008 | |
| EP | 2327652 | A1 | 6/2011 | |
| EP | 2724972 | A1 | 4/2014 | |
| EP | 2724972 | A1 * | 4/2014 | ............ B66C 13/46 |
| EP | 2574587 | B1 | 6/2014 | |
| EP | 2473374 | B1 * | 8/2015 | ............ B60P 3/426 |
| EP | 3000762 | A1 | 3/2016 | |
| JP | 8101008 | A | 4/1996 | |
| WO | 2012141987 | A1 | 10/2012 | |
| WO | 2015022001 | A1 | 2/2015 | |
| WO | 2016197251 | A1 | 12/2016 | |
| WO | WO-2016197251 | A1 * | 12/2016 | ............ G01B 11/24 |

OTHER PUBLICATIONS (Kriener, Robert C.) Co-pending International Application No. PCT/US18/62394, filed Nov. 23, 2018, Specification, Claims, Figures.
(Kriener, Robert C.) Co-pending Japanese Application No. 2020-527896, filed May 19, 2020, Specification, Claims, Figures (See PCT/US18/62394).
(Stocker, David G. et al.) Co-pending International Application No. PCT/US12/032684, filed Sep. 4, 2012, Specification, Claims, and Figures.
Besl, Paul J.; N.D. McKay (1992). "A Method for Registration of 3-D Shapes." IEEE Trans. on Pattern Analysis and Machine Intelligence. Los Alamitos, CA, USA: IEEE Computer Society. 14 (2): 239-256.
Co-pending International Application No. PCT/US12/032684, International Search Report, dated Jun. 26, 2012, 2 pages.
Co-pending International Application No. PCT/US12/032684, Written Opinion of the International Searching Authority, dated Jun. 26, 2012, 5 pages.
Co-pending International Application No. PCT/US18/62394, International Search Report and Written Opinion dated Feb. 6, 2019, 12 pages.
History of Containerization. World Shipping Council. Retrieved Aug. 19, 2020 (http://www.worldshipping.org/about-the-industry/history-of-containerization).
The Case for Automated RTG Container Handling. Nov. 21, 2013 Maritime Information Services Ltd. (https://www.porttechnology.org/technical-papers/the_case_for_automated_rtg_container_handling/).
(NPL#1 IDS Sep. 11, 2020) (Kriener, Robert C.) Co-pending Chinese Application No. 201880086338.X, filed Jul. 23, 2020, Specification, Claims, Figures (See PCT/US18/62394 for English Version), 98 pages.
(NPL#10 IDS Sep. 11, 2020) Co-pending International Application No. PCT/US12/032684, International Preliminary Report on Patentability, dated Oct. 15, 2013, 6 pages.
(NPL#14 IDS Sep. 11, 2020) Co-pending Japanese Application No. 2020-527896, Voluntary Amendment (with English Version of the Claims), filed Jul. 21, 2020, 38 pages.
(NPL#2 IDS Sep. 11, 2020) (Kriener, Robert C.) Co-pending European Application No. 18880369.6, filed Jun. 23, 2020, Specification, Claims, Figures, 78 pages.
(NPL#5 IDS Sep. 11, 2020) (Kriener, Robert C.) Co-pending U.A.E. Application No. P6000738/2020, filed May 21, 2020, Specification, Claims, Figures (See PCT/US18/62394), 98 Pages.
(NPL#6 IDS Sep. 11, 2020) (Stocker, David G. et al.) Co-pending U.S. Appl. No. 13/575,967, filed Jul. 30, 2012, Specification, Claims, and Figures, 19 Pages.
(Npl#7 ids Sep. 11, 2020) (Stocker, David G. et al.) Co-pending U.S. Appl. No. 14/230,571, filed Mar. 31, 2014, Specification, Claims, and Figures, 22 pages.
(NPL#8 IDS Sep. 11, 2020) (Stocker, David G. et al.) Co-pending International Application No. PCT/US12/032684, filed Sep. 4, 2012, Specification, Claims, and Figures, 19 pages.
Co-pending European Application No. 18880369.6, Amendment dated Jan. 12, 2021, 106 pages.
Co-pending European Application No. 18880369.6, Extended European Search Report dated Jul. 27, 2021, 8 pages.
Co-pending European Application No. 18880369.6, Response to Aug. 13, 2021 Communication pursuant to Rules 70(2) and 70a(2) EPC, dated Feb. 23, 2022, 15 pages.
Co-pending Japanese Application No. 2020-527896, Office Action dated Oct. 3, 2022 (4 pages) with English Translation (5 pages).
Co-pending European Application No. 18880369.6, Response to Communication pursuant to Article 94(3) EPC dated Mar. 23, 2023, dated Sep. 29, 2023, 14 pages.

\* cited by examiner

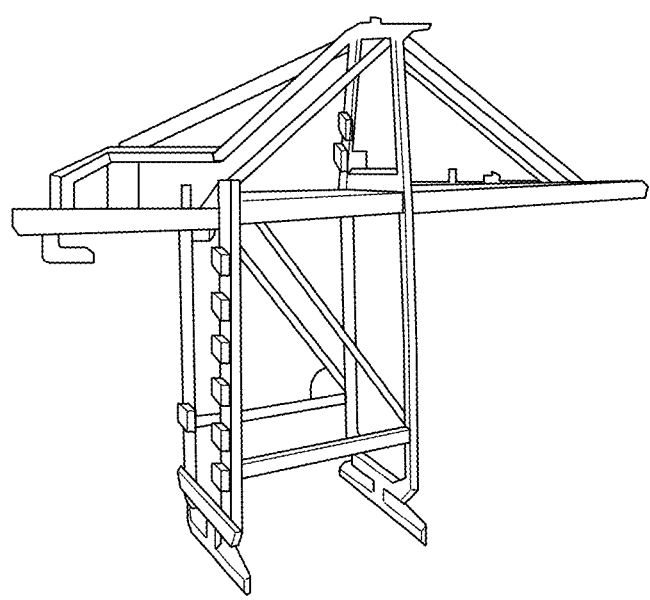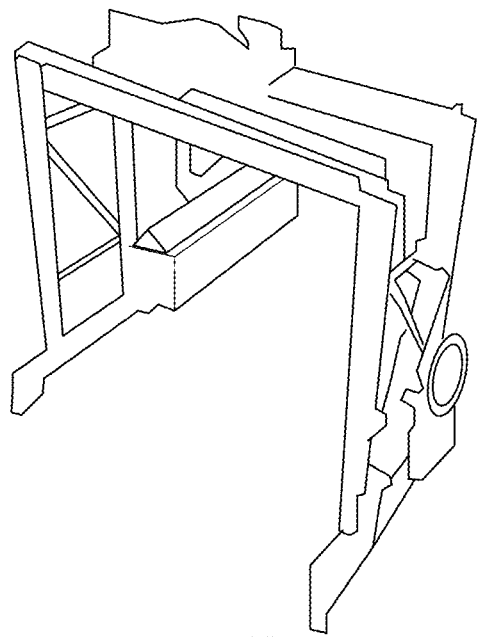
FIG. 4A
FIG. 4B

FIG. 30

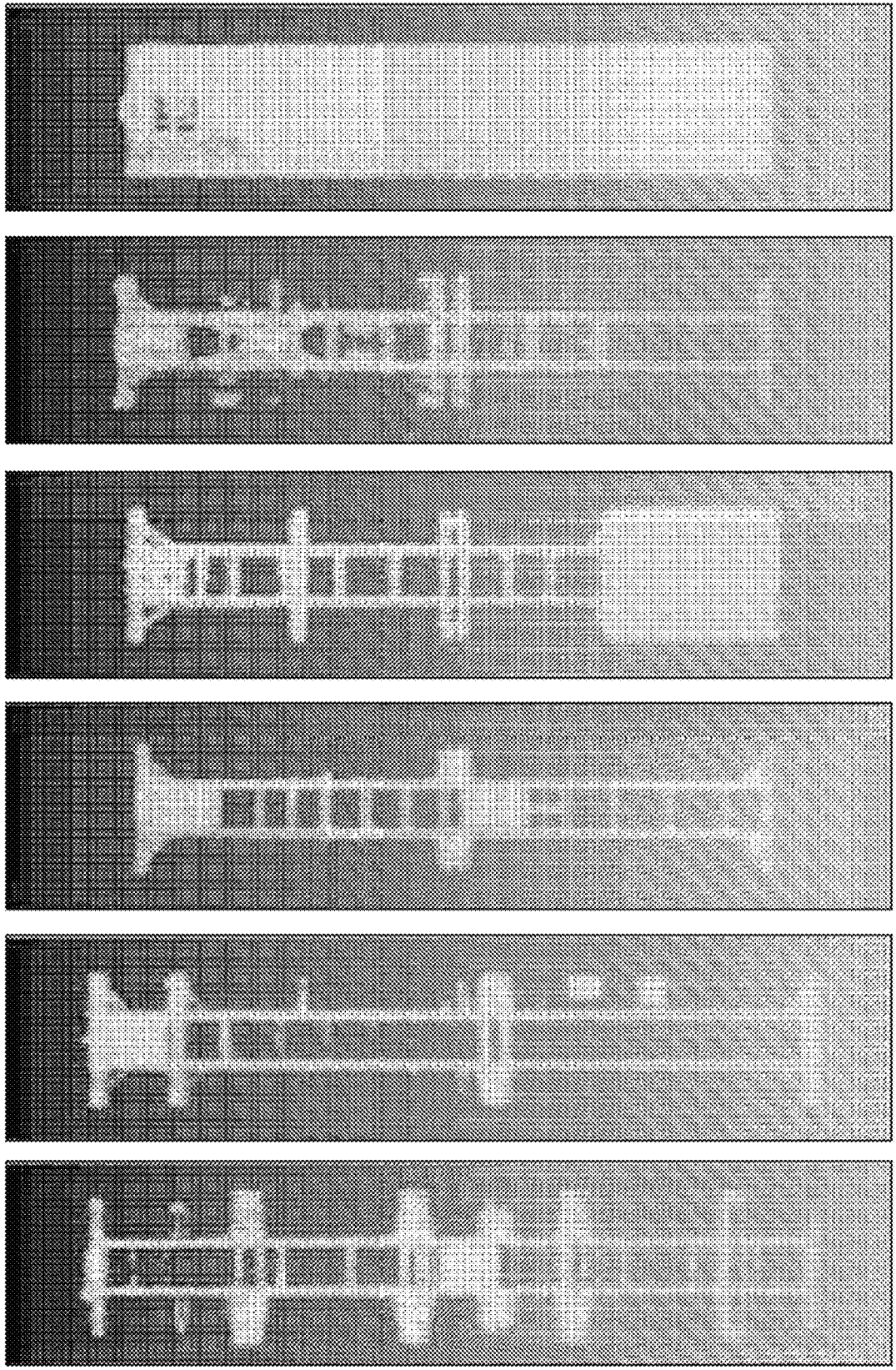

METHODS AND SYSTEMS FOR GENERATING LANDING SOLUTIONS FOR CONTAINERS ON LANDING SURFACES

CROSS-REFERENCE TO RELATED APPLICATIONS

The present application is a National Stage application under 35 U.S.C. § 371 of International Application No. PCT/US18/62394, filed Nov. 23, 2018 which application relies on the disclosure of and claims priority to and the benefit of the filing date of U.S. Provisional Application No. 62/590,443 filed Nov. 24, 2017, and U.S. Provisional Application No. 62/626,990 filed Feb. 6, 2018, the disclosures of which are hereby incorporated by reference in their entireties.

BACKGROUND OF THE INVENTION

Field of the Invention

The present invention relates to container crane operations such as those used in international shipping. More particularly, the present invention relates to methods and systems for generating landing solutions for containers on a vehicle chassis or other landing surfaces.

Description of Related Art

Since the commencement of container shipping in 1955, the cargo transportation industry has been striving toward increased efficiency with moving cargo. From the advent of the shipping container followed shortly by standardized equipment to handle it at the various stages of shipping (a system termed "intermodalism"), the industry has been striving for faster moves, more standardization, higher production, and less human intervention. These things are being accomplished through incremental developments in automation for container handling equipment.

Technology has existed to facilitate automation of container handling equipment, such as container cranes. In the beginning of crane automation, the areas which involved unavoidable access by people were deemed too risky to automate. Eventually pressures to increase productive moves and reduce wait times prompted the industry standard into a state of full automation in areas free from direct contact with people and "semi-automation," often involving remote operation, in the areas in which contact with people is unavoidable. More recently, however; the industry has been striving toward fully automated moves in all areas of container handling. Specifically of interest in this disclosure is automation in the landside transfer zone (LSTZ) an example of which can be seen in FIG. 12-B. The LSTZ area is where the stacking cranes interface with vehicles which transport containers over the road, as well as with internal port equipment other than road chassis. There has been much interest over the last few years to fully automate operations in the LSTZ.

The challenges presented with automating operations in the LSTZ are vast. To design a system which can automate moves in the LSTZ one must overcome the variability introduced by non-standard chassis and equipment types, presence or lack of specific landing points, safety of people in the area of operation, and placement of the equipment within the area of operation. The primary challenge to automation typically comes from the variability which humans introduce with regards to how they place the chassis in the LSTZ and where the people are during the operations. This variability, however; in the case of the LSTZ is mitigated through mechanical limitations imposed, such as curbs surrounding a truck lane (FIG. 12, item C) and booths for the driver to enter (FIG. 12, item D), which limit the variability which a human can induce as long as certain rules are followed when operating in this area. In addition to the human variability problem is the issue of non-standardization in the chassis and equipment which the crane must land containers on. Although the shipping containers follow an ISO (International Organization for Standardization) standard for their shape and size, the chassis and other equipment which carry the containers do not. The only constraint upon a given road chassis is that somewhere on the landing surface of the chassis, there are typically one or more and preferably multiple twistlocks which mate with the corner castings of a container which is placed upon the chassis. This means that at least with road chassis, but not necessarily with other container carrying equipment, there will typically be four points on the chassis corresponding to the four corners of the container which will be placed upon the chassis. Once found, these four points can be used to generate a solution for where to place the container upon the chassis surface. The caveat, however; is that these four points may exist anywhere on the surface of the road chassis, as long as they are appropriately spaced apart from one another so as to conform to the four corners of the container which they are to mate with. There is also variation in the size and shape of twistlocks which affects the system's ability to locate them and impacts the exact landing position of the container.

If the equipment which is poised to receive a container does not have twistlocks, then it can be even more difficult to determine a landing position since there are no constrained points on the surface for which to search and there is not enough uniformity in equipment to visually recognize it with cameras or similar sensors based purely on its optical appearances. Appearances of the equipment being landed on may differ in shape, size, color, wear patterns, etc. which prevents optical systems from being effective in identifying them.

In the last few years, there have been a couple of systems developed which claim to fully automate operations and remove the need for remote operators to perform interactions with road chassis and other equipment in the LSTZ. The systems and methods proposed must overcome all the aforementioned challenges to successfully perform the operations which they claim to fully automate, however; those systems and methods use sensors which do not fully address the challenges. Examples of efforts in this area include those described in U.S. Patent Application Publication No. 2012/0089320 A1, International Patent Application Publication No. WO 2015/022001 A1, German Patent Application Publication Nos. DE 10 2008 014 125 A1 and DE 10 2007 055 316 A1, European Patent No. EP 2574587 B1, and European Patent Application Publication Nos. EP 2724972 A1, EP 2327652 A1, and EP 2724972 A1. Yet, despite these efforts, there remains a need in the art to address the above deficiencies.

SUMMARY OF THE INVENTION

Embodiments of the invention provide a method and system for addressing the above challenges in a more robust manner to produce more accurate solutions than existing systems. In embodiments, the present invention describes methods of generating landing solutions for objects, such as containers, onto target equipment and the landing surfaces on the target equipment using multiple measurement points generated by a measuring device or multiple measuring devices, as well as a corresponding device for carrying out the method and a corresponding computer program product. Landing surfaces may include any landing surface on any equipment, such as any piece of equipment designed to accept a container when placed upon the landing surface from above by a piece of container handling equipment.

In embodiments, the present invention describes methods of analyzing a plurality of measurement points, such as the data of a point cloud (point cloud being defined as a collection of points which can be represented in the Cartesian coordinate space as x, y, and z coordinate points) and from the stages of analysis of the data, determining the location and orientation in 6DoF (Degrees of Freedom), in the container handling equipment's frame of reference, of where to place a shipping container onto a landing surface present within the equipment's workspace. This location can then be used by the equipment's automation system to automatically place the shipping container onto the landing surface without the need for human input, or minimal human input or interaction. The method and system are applicable to operating in a Landside Transfer Zone as well as outside such zone, and as such would be applicable to install on any Container Handling Equipment which can land containers on equipment from above.

Specific aspects of embodiments of the invention include Aspect 1, which are methods of determining a landing solution for an ISO container the methods comprising: (a) scanning target equipment or a chassis to produce a point cloud in which features of a landing surface of the target equipment or chassis, such as one or more twistlocks, are distinguishable; (b) analyzing the point cloud by way of a processor to determine the locations of the features and/or twistlocks; and (c) determining a center of the landing surface of the target equipment or chassis based on the locations of the features and/or twistlocks. Aspect 2 includes such methods where the processor uses techniques such as local minima and local maxima of the landing surface of the target equipment or chassis, and/or model convolution, to determine locations of raised and recessed features and/or twistlocks. Aspect 3 is a method of Aspects 1 or 2, wherein the scanning is performed using one or more cameras, LiDAR, sonar, or optical sensors, or combinations thereof.

Specific aspects of embodiments of the invention also include Aspect 4, which are methods of determining a landing location for an object on a landing surface of target equipment, the methods comprising: (a) providing target equipment, such as a chassis, loaded with a first object, such as a container; (b) generating one or more coordinates of the first object or container in space; (c) removing the first object or container from the target equipment or chassis to reveal a landing surface of the target equipment or chassis; (d) scanning the target equipment or chassis and generating a model of the target equipment or chassis landing surface; and (e) determining a landing location on the target equipment or chassis for the first object or container by determining a center of the target equipment or chassis landing surface within the model based on the one or more coordinates of the first object or container. Aspect 5 is a method of Aspect 4, further comprising determining one or more object or container offsets to identify additional landing locations on the target equipment or chassis landing surface. Aspect 6 is a method of Aspects 4 or 5, wherein the one or more offsets are determined by (a) placing one or more second object or container on the target equipment or chassis landing surface; (b) generating one or more coordinates of the second object or container in space; and (c) determining the distance that the second object or container is offset from the center of the target equipment or chassis landing surface based on the one or more coordinates of the second object or container. Aspect 7 is a method of any of Aspects 4-6, wherein any number of landing positions is determined from the one or more offsets, such as wherein the one or more container offsets comprise a front container offset, a rear container offset, or both front and rear container offsets. Aspect 8 is a method of any of Aspects 4-7, further comprising storing the landing location for the first object or container and the one or more offsets to create a library of models representing multiple landing locations for the landing surface of the target equipment or chassis. Aspect 9 is a method of any of Aspects 4-8, wherein the generating is performed by way of one or more measurement devices comprising one or more cameras, LiDAR, sonar, or optical sensors, or combinations thereof. Aspect 10 is a method of any of Aspects 4-9, wherein the target equipment or chassis is an Automatically Guided Vehicle (AGV) chassis, an AGV rack, a Bomb Cart chassis, a rail car, a street chassis, or a cassette. Aspect 11 is a method of any of Aspects 4-10, wherein the container is a shipping container shaped and sized according to the International Organization for Standardization (ISO). Aspect 12 is a method of any of Aspects 4-11, wherein the model of the target equipment or chassis landing surface is represented by a 3D point cloud of data. Aspect 13 is a method of any of Aspects 4-12, wherein the model of the target equipment or chassis landing surface is generated from scanning the target equipment or chassis a single time or multiple times, for example, 2-20 times, such as 3-18 times, or 4-15 times, or 5-10 times. Aspect 14 is a method of any of Aspects 4-13, wherein the model is generated from scanning a single time and by scanning in a manner to achieve high resolution data.

Specific aspects of embodiments of the invention also include Aspect 15, which are methods of determining a landing location for an object, such as a container, on a landing surface of target equipment, such as a chassis, the methods comprising: (a) scanning a first target equipment or chassis and providing a model of the first target equipment or chassis; (b) comparing the model of the first target equipment or chassis to one or more reference target equipment or chassis to identify which reference target equipment or chassis matches the first target equipment or chassis within a selected degree of matching; and (c) using a known object or container landing location of the matching reference target equipment or chassis as a proxy for an object or container landing location on the first target equipment or chassis. Aspect 16 is a method of Aspect 15, wherein the container is an ISO shipping container. Aspect 17 is a method of Aspects 15 or 16, wherein the scanning is performed using one or more of cameras, LiDAR, sonar, or optical sensors, or combinations thereof. Aspect 18 is a method of any of Aspects 15-17, wherein the model of the first target equipment or chassis and the reference target equipment or chassis are represented by a 3D point cloud of data. Aspect 19 is a method of any of Aspects 15-18, wherein the comparing involves identifying one or more reference target equipment or chassis having a length within a specified range of that of the first target equipment or chassis, and/or using a voxel filter to identify similarities between the reference target equipment or chassis and the first target equipment or chassis. Aspect 20 is a method of any of Aspects 15-19, wherein the voxel filter compares data across one or multiple dimensions of the 3D data cloud. Aspect 21 is a method of any of Aspects 15-20, wherein the voxel filter compares any combination of x-, y, and/or z-values. Aspect 22 is a method of any of Aspects 15-21, wherein the known object or container landing location of the matching reference target equipment chassis is determined by: (a) providing a reference target equipment or chassis loaded with a first reference object or container; (b) generating one or more coordinates of the first reference object or container in space; (c) removing the first reference object or container from the reference target equipment or chassis to reveal a landing surface of the reference target equipment or chassis; (d) scanning the reference target equipment or chassis and generating a model of the reference target equipment or chassis landing surface; and (e) determining a landing location for the first reference object or container on the reference target equipment or chassis by determining a center of the landing surface of the reference target equipment or chassis within the model based on the one or more coordinates of the first reference object or container.

Specific aspects of embodiments of the invention also include Aspect 23, which are methods of determining the orientation of target equipment or a chassis within an operating frame of reference for container handling equipment, the methods comprising: (a) providing a data point cloud representing a reference target equipment or chassis; (b) providing a data point cloud representing a current target equipment or chassis; (c) positioning the reference target equipment or chassis data point cloud at an expected virtual position within an operating frame of reference for container handling equipment; (d) estimating a first center of a landing surface of the reference target equipment or chassis and a second center of a landing surface of the current target equipment or chassis within their respective data point clouds; (e) performing a first alignment by aligning the first center with the second center; (f) determining any translation(s), such as in XYZ coordinates, from the location of the first center to the location of the second center that is needed to achieve the first alignment; (g) performing at least one second alignment by aligning the landing surface of the reference target equipment or chassis and the landing surface of the current target equipment or chassis in another manner; (h) determining any rotation(s) of the reference chassis data point cloud, such as about XYZ axe(s), that are needed to achieve the second alignment; and (i) using the translation(s) and/or rotation(s) to estimate an actual orientation of the current target equipment or chassis within the operating frame of reference of the container handling equipment. Aspect 24 is a method of Aspect 23, wherein one or more of the at least one second alignment is performed using iterative closest point techniques. Aspect 25 is a method of Aspects 23 or 24, wherein noisy data of the data point cloud representing the current target equipment or chassis is reduced or eliminated to provide a filtered current target equipment or chassis point cloud. Aspect 26 is a method of any of Aspects 23-25, wherein maximum and minimum measurement points of the filtered current target equipment or chassis point cloud are used to estimate the center of the landing surface of the current target equipment or chassis.

Specific embodiments of the invention also include Aspect 27, which are methods of identifying a landing position on target equipment or a chassis for an ISO shipping container according to the position and orientation of the target equipment or chassis, the methods comprising: (a) obtaining a point cloud model of a current target equipment or chassis landing surface which is disposed in a frame of reference of a container handling equipment; (b) aligning a point cloud model of a reference target equipment or chassis landing surface with the point cloud model of the current target equipment or chassis landing surface; and (c) producing a set of coordinates in the frame of reference as a result of the aligning, which coordinates represent a landing position for placing an ISO shipping container on the landing surface of the current target equipment or chassis. Aspect 28 is a method of Aspect 27, wherein the aligning comprises: positioning the reference target equipment or chassis landing surface at an expected position and orientation in the frame of reference of the container handling equipment. Aspect 29 is a method of Aspects 27 or 28, wherein the aligning comprises: (a) determining a first center of the landing surface of the current target equipment or chassis within the current target equipment or chassis point cloud model; (b) determining a second center of the landing surface of the reference target equipment or chassis within the reference target equipment or chassis point cloud model; (c) obtaining a course alignment by aligning the first and second centers; and (d) obtaining a fine alignment by iteratively minimizing distances between corresponding points in the current chassis point cloud model and points in the reference chassis point cloud model to arrive at the fine alignment. Aspect 30 is a method of any of Aspects 27-29, wherein iteratively minimizing the distances involves an iterative closest point (ICP) algorithm.

Specific aspects of embodiments of the invention also include Aspect 31, which are methods of identifying a type of target equipment or chassis capable of holding an ISO shipping container, the methods comprising: (a) obtaining a point cloud model of a current target equipment or chassis landing surface; and (b) comparing the point cloud model of the current target equipment or chassis landing surface to one or more reference target equipment or chassis landing surfaces to identify which reference target equipment or chassis landing surface matches the current target equipment or chassis landing surface within a selected degree of matching; or (c) analyzing the point cloud model of the current target equipment or chassis landing surface to identify a type of target equipment or chassis that the point cloud model of the current target equipment or chassis landing surface is associated with. Aspect 32 is a method of Aspect 31, further comprising using a neural network and a sample of reference target equipment or chassis landing surfaces to teach the neural network what is a matching target equipment or chassis cloud. Aspect 33 is a method of Aspects 31 or 32, wherein the comparison involves comparing metadata obtained from the point cloud model of the current target equipment or chassis landing surface and one or more of the point cloud models of the reference target equipment or chassis landing surfaces. Aspect 34 is a method of any of Aspects 31-33, wherein the comparing and/or analyzing is performed to identify similarities or differences in surface characteristics between the current target equipment or chassis landing surface and one or more of the reference target equipment or chassis landing surfaces and/or between the current target equipment or chassis landing surface and a known target equipment or chassis landing surface. Aspect 35 is a method of any of Aspects 31-34, wherein the comparing and/or analyzing is performed to identify one or more of: (a) continuous or discontinuous surfaces; (b) data abnormalities; (c) a type of landing surface feature; (d) the presence or absence of one or more landing surface features such as girders, cross members, supports, and/or guides; (e) the spacing of one or more landing surface features such as girders, cross members, supports, and/or guides relative to similar landing surface features, or relative to one another or relative to another point of reference; (d) the actual or relative shape, dimension(s) and/or size of landing surface features such as girders, cross members, supports, and/or guides; and/or (e) one or more characteristics of one or more landing surface profiles such as bends, step downs, warping, and/or ramps; or combinations of one or more of these. Aspect 36 is a method of any of Aspects 31-35, wherein the metadata is obtained from a voxel filter. Aspect 37 is a method of any of Aspects 31-36, wherein the voxel filter operates to analyze the point cloud model of the current target equipment or chassis landing surface and/or one or more of the point cloud models of the reference target equipment or chassis landing surfaces as a series of boxes each covering a 3D space. Aspect 38 is a method of any of Aspects 31-37, wherein the metadata comprises: (a) a number of points in each box; (b) greatest z-coordinate value in each of box of an X-Y plane; or (c) whether a particular box is occupied. Aspect 39 is a method of any of Aspects 31-38, wherein the metadata is compared by way of: (a) a binary similarity comparison; (b) looking for cross members and their locations, such as based on the number of boxes with points visible in an X-Y plane of the cloud point model(s); (c) measuring maxima along the length of the chassis and calling those maxima objects of interest which define a certain chassis; (d) or combinations of one or more of these. Aspect 40 is a method of any of Aspects 31-39, wherein the binary similarity comparison comprises subtracting metadata from the point cloud model of the current target equipment or chassis landing surface from the metadata from the point cloud models of the reference target equipment or chassis landing surfaces to arrive at an error for each comparison. Aspect 41 is a method of any of Aspects 31-40, wherein the metadata is compared by way of a binary column comparison. Aspect 42 is a method of any of Aspects 31-41, wherein the binary column comparison comprises: (a) summing the number of occupied boxes in each column for the current target equipment or chassis landing surface and for each reference target equipment or chassis landing surface to arrive at a set of column totals; and (b) comparing the set of column totals between the current target equipment or chassis landing surface with that of each reference target equipment or chassis landing surface to arrive at an error for each comparison.

Specific aspects of embodiments of the invention also include Aspect 43, which are methods of landing an object on a landing surface, the methods comprising: (a) scanning a target equipment or chassis; (b) providing a model of the target equipment or chassis; (c) comparing the model to one or more reference equipment or chassis; (d) identifying which of the one or more reference equipment or chassis matches the target equipment or chassis within a selected degree of matching; (e) determining a height of a target landing location on the target equipment or chassis using height of a known landing location on the matching reference equipment or chassis as proxy; and (f) landing an object or container on the target landing location by lowering the object or container at a speed then decreasing the speed as the object or container approaches the height of the target landing location as determined by proxy. Aspect 44 is a method of Aspect 43, wherein the object or container is an ISO shipping container. Aspect 45 is a method of Aspects 43 or 44, wherein the scanning is performed using one or more of cameras, LiDAR, sonar, or optical sensors, or combinations thereof. Aspect 46 is a method of any of Aspects 43-45, wherein the models of the target equipment or chassis and the reference equipment or chassis are represented by a 3D point cloud of data. Aspect 47 is a method of any of Aspects 43-46, wherein the comparing involves identifying one or more reference equipment or chassis having a length within a specified range of that of the target equipment or chassis, and/or using a voxel filter to identify similarities between the reference equipment or chassis and the target equipment or chassis. Aspect 48 is a method of any of Aspects 43-47, wherein the voxel filter compares data across one or multiple dimensions of the 3D data cloud. Aspect 49 is a method of any of Aspects 43-48, wherein the voxel filter compares any combination of x-, y-, and/or z-values.

Specific aspects of embodiments of the invention also include Aspect 50, which are methods of landing an ISO shipping container on a target equipment or chassis, the methods comprising: (a) obtaining a point cloud model of a current target equipment or chassis landing surface which is disposed in a frame of reference of a container handling equipment; (b) aligning a point cloud model of a reference equipment or chassis landing surface with the point cloud model of the current target equipment or chassis landing surface; (c) producing a set of coordinates in the frame of reference as a result of the aligning, which coordinates represent a target landing location, and a height thereof, for placing an ISO shipping container on the landing surface of the current target equipment or chassis; and (d) landing the ISO shipping container on the landing surface of the current target equipment or chassis by lowering the ISO shipping container at a speed then decreasing the speed as the ISO shipping container approaches the height of the target landing location. Aspect 51 is a method of Aspect 50, wherein the aligning comprises: positioning the reference equipment or chassis landing surface at an expected position and orientation in the frame of reference of the container handling equipment.

Specific aspects of embodiments of the invention include Aspect 52, which are methods of landing an ISO shipping container, the methods comprising: (a) obtaining a point cloud model of a target equipment or chassis landing surface; and (b) comparing the point cloud model of the target equipment or chassis landing surface to one or more reference equipment or chassis landing surfaces to identify which reference equipment or chassis landing surface matches the target equipment or chassis landing surface within a selected degree of matching; or (c) analyzing the point cloud model of the target equipment or chassis landing surface to identify a type of equipment or chassis that the point cloud model of the target equipment or chassis landing surface is associated with; (d) determining at least a height of the landing surface of the target equipment or chassis; and (e) landing an ISO shipping container on the landing surface of the target equipment or chassis by lowering the ISO shipping container at a speed then decreasing the speed as the ISO shipping container approaches the height of the landing surface of the target equipment or chassis.

Specific aspects of embodiments of the invention include Aspect 53, which are methods of landing an object or container on a landing surface, the methods comprising: (a) providing a data point cloud representing a reference equipment or chassis; (b) providing a data point cloud representing a target equipment or chassis; (c) positioning the reference equipment or chassis data point cloud at an expected virtual position within an operating frame of reference for container handling equipment; (d) estimating a first center of a landing surface of the reference equipment or chassis and a second center of a landing surface of the target equipment or chassis within their respective data point clouds; (e) performing a first alignment by aligning the first center with the second center; (f) determining any translation(s), such as in XYZ coordinates, from the location of the first center to the location of the second center that is needed to achieve the first alignment; (g) performing at least one second alignment by aligning the landing surface of the reference equipment or chassis and the landing surface of the target equipment or chassis in another manner; (h) determining any rotation(s) of the reference chassis data point cloud, such as about XYZ axe(s), that are needed to achieve the second alignment; (i) using the translation(s) and/or rotation(s) to estimate an actual height of the landing surface of the target equipment or chassis; and (j) landing an object or container on the landing surface of the target equipment or chassis by lowering the object or container at a speed then decreasing the speed as the object or container approaches the height of the landing surface of the target equipment or chassis. Aspect 54 is a method of Aspect 53, wherein the object or container is an ISO shipping container.

Specific aspects of embodiments of the invention also include Aspect 55, which are systems comprising: (a) container handling equipment; (b) one or more measurement devices placed on or near the container handling equipment; (c) one or more processors; and (d) a memory comprising a set of computer executable instructions configured to instruct the one or more processors to perform the method of any of Aspects 1-54. Aspect 56 is a system of Aspect 55, wherein the memory is stored on a non-transitory computer readable storage medium. Aspect 57 is a system of Aspects 55 or 56, wherein the one or more measurement devices comprise cameras, LiDAR, sonar, or optical sensors, or combinations of one or more of these. Aspect 58 is a system of any of Aspects 55-57, wherein the container handling equipment comprises: (a) a motion control system; and (b) container lifting gear, such as a spreader. Aspect 59 is a system of any of Aspects 55-58, wherein the one or more measurement devices are placed on the container handling equipment or a mobile portion thereof.

Additional embodiments and aspects of the invention will be apparent in the foregoing detailed description.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

FIGS. 4A-B are diagrams of Container Cranes.

FIG. 30 is a diagram of a Binary Column Comparison according to an embodiment of the invention.

FIGS. 39A-F are renderings showing a series of filtered scans for several chassis types according to embodiments of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Definitions

Figure 1:
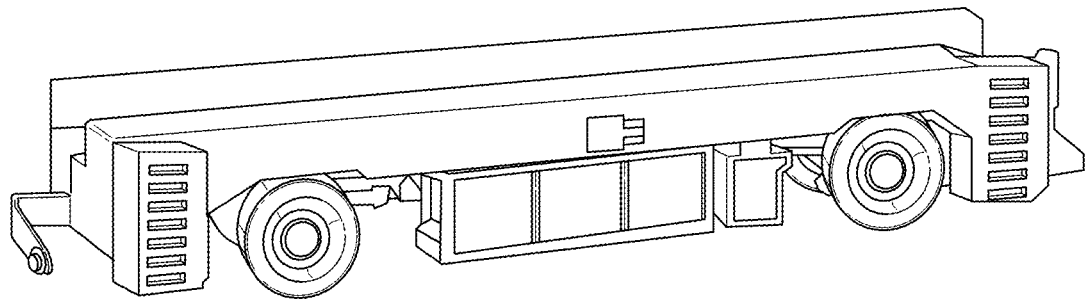
FIG. 1 is a diagram of an AGV Unloaded.

Automated Guided Vehicle (AGV): An AGV is a piece of port equipment designed to transport ISO containers between areas of a port. The vehicle is designed to be loaded and unloaded from the top and navigates about the port using sensors with no operator either locally or remote. An example is shown in FIG. 1 which shows an unloaded AGV.

Block/Container Storage Area/Stacking Area/Stack(s): In this document the block is the term used for the container storage area where the container handling crane stacks containers pending their transport.

Figure 2:
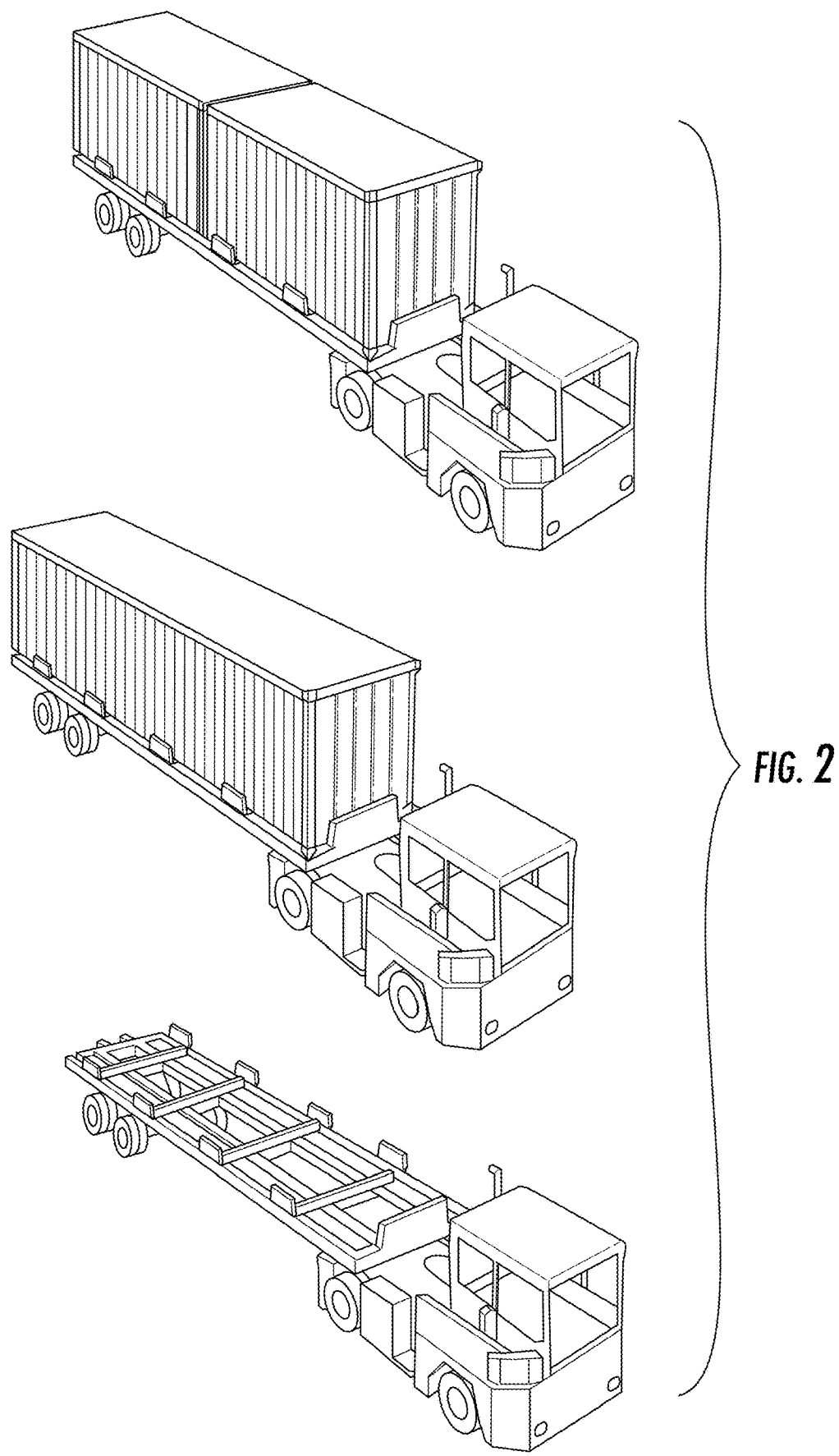
FIG. 2 is a diagram of Bomb Carts, unloaded and loaded with ISO-Standard Containers.
Figure 3:
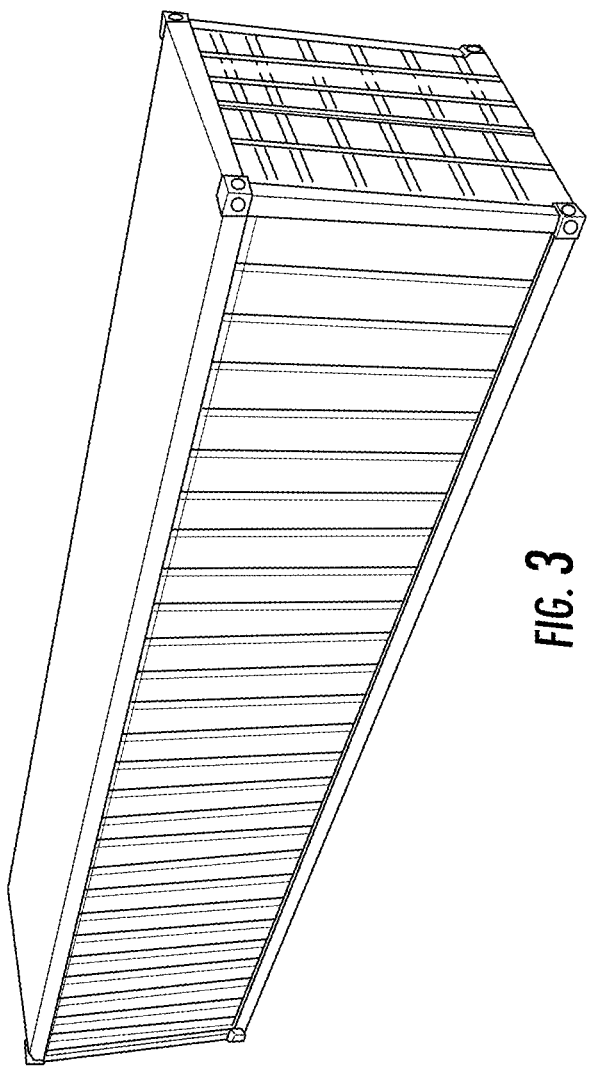
FIG. 3 is a diagram of an ISO-Standard Shipping Container (40 foot).

Bomb Cart/Cassette: Truck chassis (trailer) designed and manufactured for the purpose of transferring standard shipping containers in a container terminal. These typically do not have any locking mechanisms for the container. Examples are shown in FIG. 2 which shows Bomb Carts unloaded and loaded with ISO-Standard Containers. An example of an ISO-Standard Shipping Container (40 foot) is shown in FIG. 3.

Booth/Driver Booth: In this document the booth is a specified location, often an enclosure, in each lane of the landside transfer zone in which the truck driver or equipment operator must be present during the operation of the crane.

Container/Box/Reefer/Tank/Flat-Racks: Shipping containers, as defined by ISO standard. Containers used in International and domestic transport. Standard lengths include but are not limited to 20, 40 and 45 feet. Also, a multitude of container types are included in the standard beyond just metal corrugated wall containers.

Container Crane/Container Handling Crane: Crane used to move shipping containers, e.g., where containers are transferred from ship to shore at a port, where containers are moved within a storage area, or where containers are transferred to or from trucks at a container terminal or rail yard. Examples of container cranes are shown in FIGS. 4A-B.

Container Handling Equipment (CHE): Any piece of equipment designed for handling or transporting containers around terminals. Most often this would be some variety of crane, but could also include equipment such as top pickers, straddle carriers, or similar. Typically, this class of equipment is capable of vertically lifting and placing containers.

Figure 5:
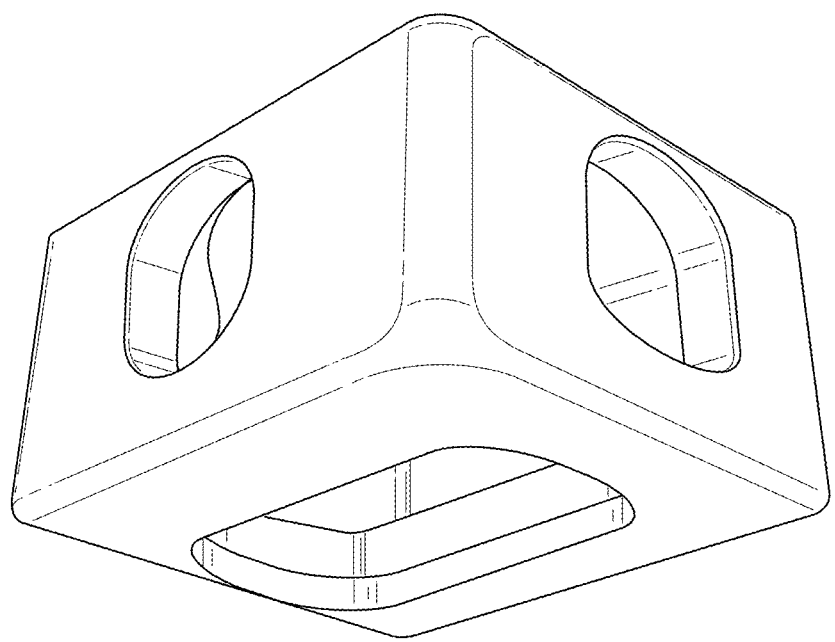
FIG. 5 is a diagram of an ISO Standard Corner Casting.

Corner Casting/Casting/Corner Fitting: Corner casting, defined by ISO standard, the standard mechanical fixture at each of the 8 corners of a Container which allow it to be stacked, locked onto, and moved. An example of an ISO Standard Corner Casting is in FIG. 5.

6DoF/Six Degrees of Freedom: Six degrees of freedom refers to an XYZ position with a corresponding orientation, that is a rotation about each of those axes XYZ and commonly referred to as trim, list and skew.

Crane operating frame of reference/Crane coordinates/World Coordinates: This refers to the coordinate system, including the origin, which the crane's automated motion and regulation system works in. This often correlates to the number of millimeters/meters, in each Cartesian direction, that some specified point about the spreader of the crane is from some pre-determined surveyed location in the crane yard. In our applications crane coordinates and world coordinates are identical.

Landside Transfer Zone (LSTZ): In this document, the landside transfer zone is a portion of the container handling crane's area of service in which lanes exist for road chassis and other pieces of port equipment come to be serviced by the crane in either picking up or dropping off containers.

Lane: In this document, a lane will refer to the area in which a piece of container handling equipment parks to be serviced by the crane.

Measurement Devices: "Measurement devices," as referenced herein refers to any manner of device which can generate measurement points which may be represented as Cartesian coordinates about some origin point. Measurement devices include, but are not limited to, cameras, LiDAR, sonar, optical sensors, etc. any of which can be utilized to generate 3D (three-dimensional) measurement points.

Measurement points/Scan points/3D Data: These terms all refer to the collection of points, as measured by a measurement device, which exist as Cartesian coordinates within the crane's operating frame of reference. The terms Model Cloud and/or point Cloud may also be used to describe these features.

Model/Template: A model is defined as an object containing a model cloud and all its respective, relative landing locations as determined in "teaching" the system the landing locations for a given piece of equipment.

Model Cloud: A model cloud is a high resolution, densely sampled set of measurement points and in the context of this disclosure can represent any piece of equipment which accepts a container. In embodiments, the cloud can be filtered down to the landing surface only and can be parsed for metadata about the landing surface sufficient to classify the landing surface and provide a landing solution for where to place a container on the equipment.

Figure 6:
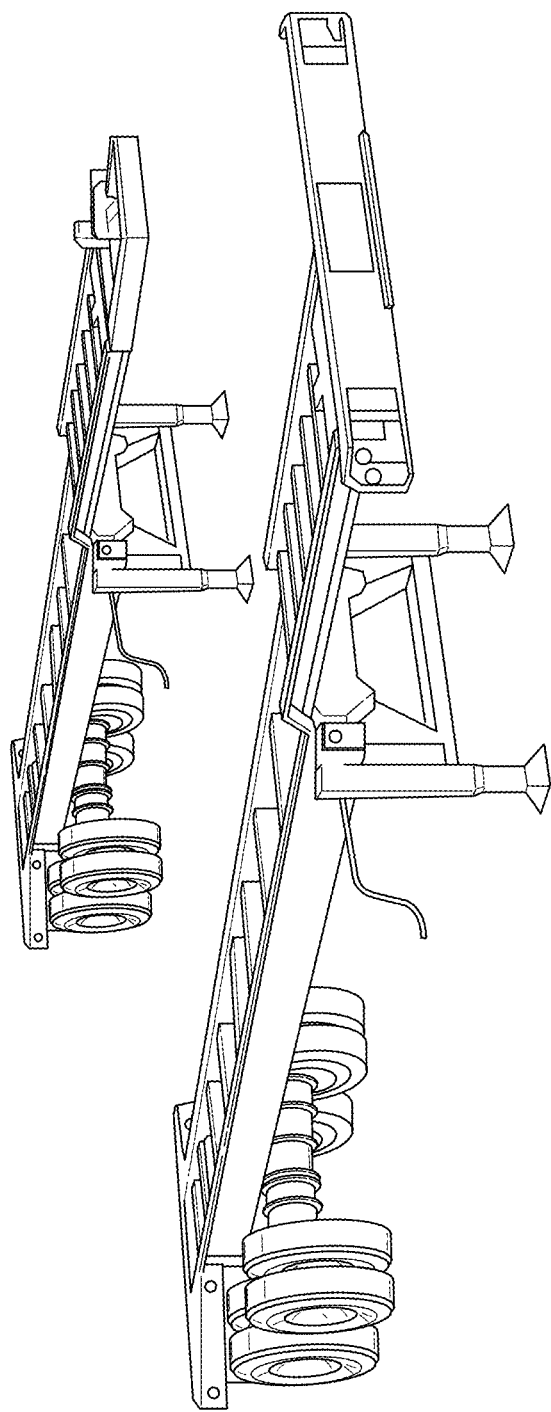
FIG. 6 is a diagram of a Road Chassis (Unloaded).

Road Chassis: Truck chassis (trailer) designed and manufactured for the purpose of transferring standard shipping containers on the roads outside a container terminal. These chassis typically have twistlocks at the ISO standard positions for the corresponding size of container they are designed to carry. An example of a Road Chassis (Unloaded) is in FIG. 6.

Figure 7:
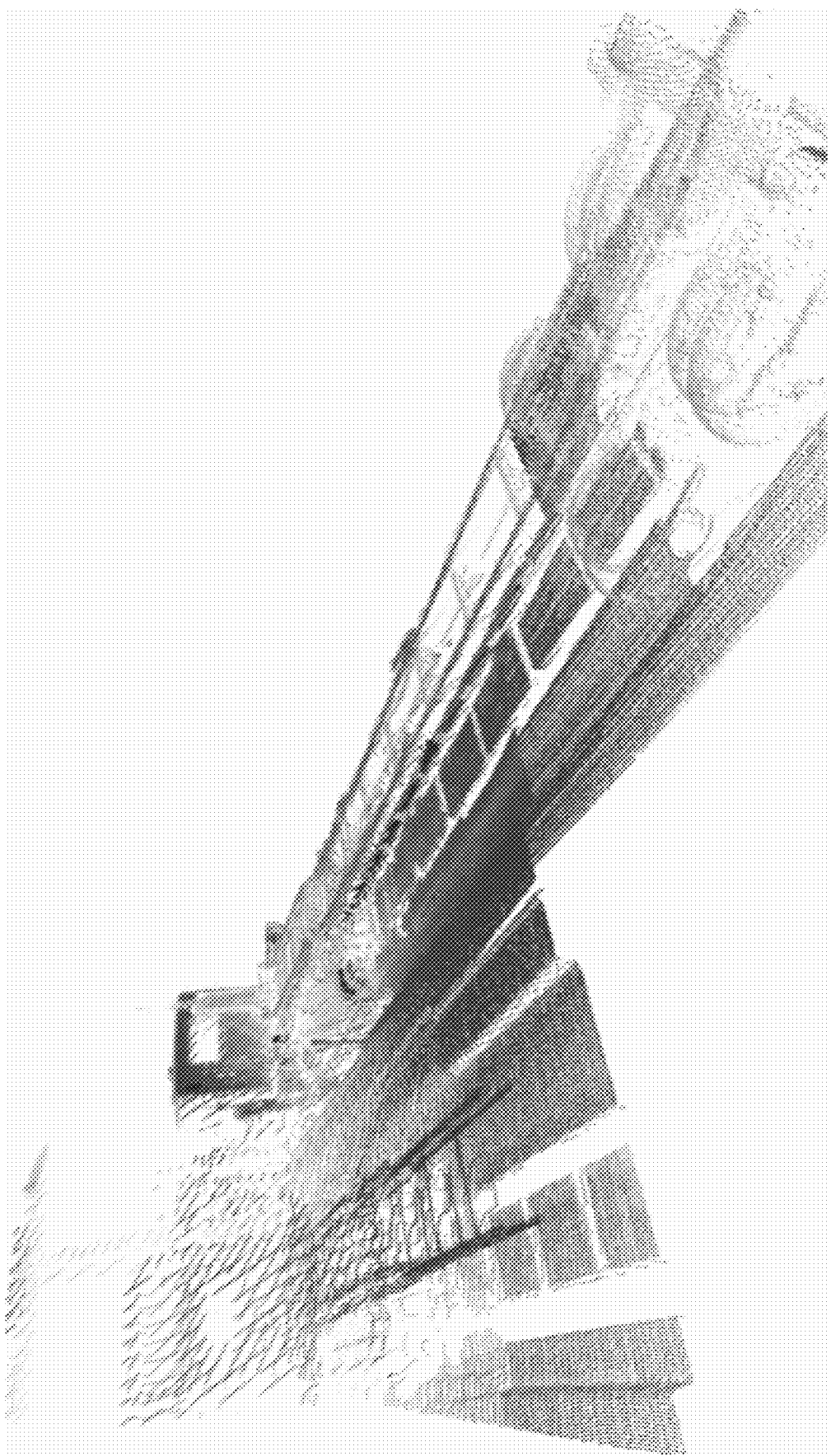
FIG. 7 is a rendering of a Point Cloud of a Road Chassis in a Landside Transfer Zone according to an embodiment of the invention.

Point Cloud: Point cloud is a term used to refer to a collection of 3D data points in a coordinate system. FIG. 7 shows an example of a rendering of a Point Cloud of a Road Chassis in a Landside Transfer Zone. The term cloud can also be used to refer to a point cloud.

Figure 8:
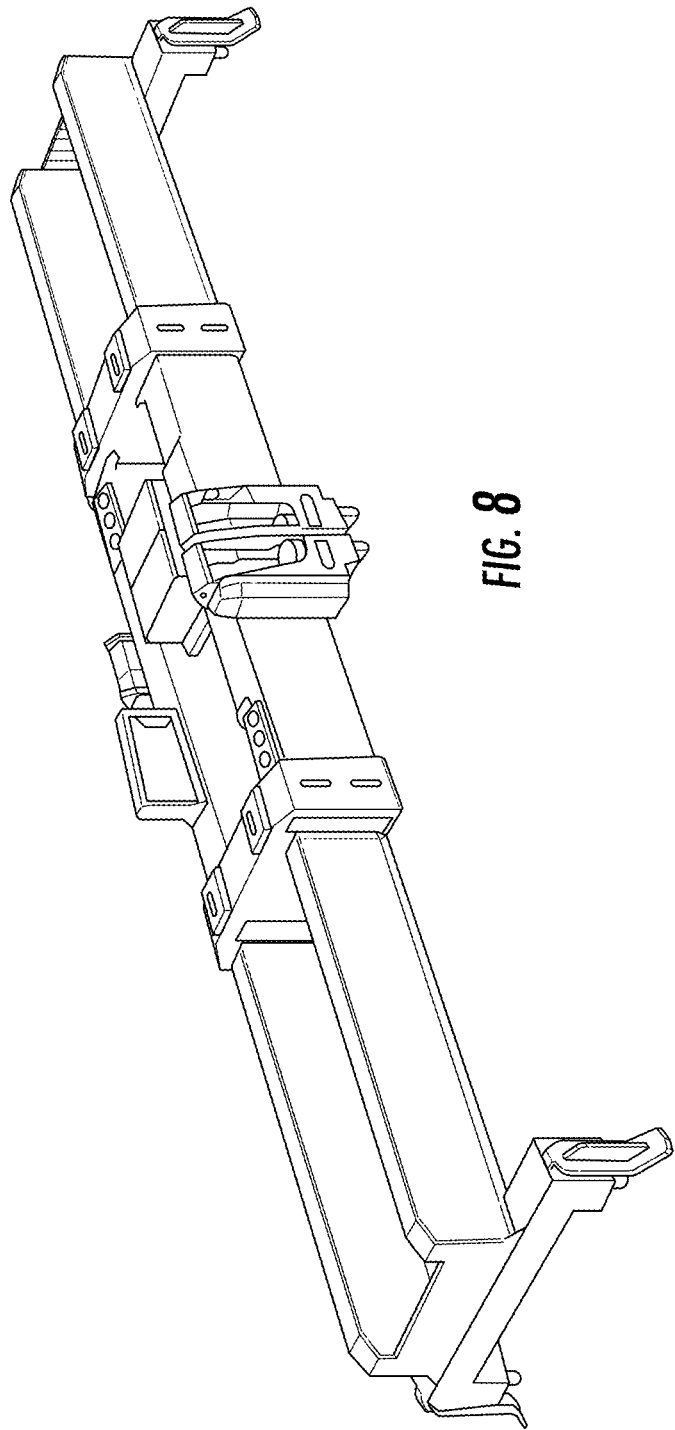
FIG. 8 is a diagram of a Spreader at the 40 ft. Position.

Spreader/Hook/(Spreader) Bar: The spreader is the device which locks onto an ISO container to allow a crane to move a container. An example of a spreader at the 40 ft. Position is shown in FIG. 8.

Truck Lane: Truck lane can be one of either, a lane in the landside transfer zone in which a truck parks to be serviced, or a lane under the crane which runs the length of the block adjacent to the stacks of containers in the block in which trucks are serviced by the crane.

Figure 9:
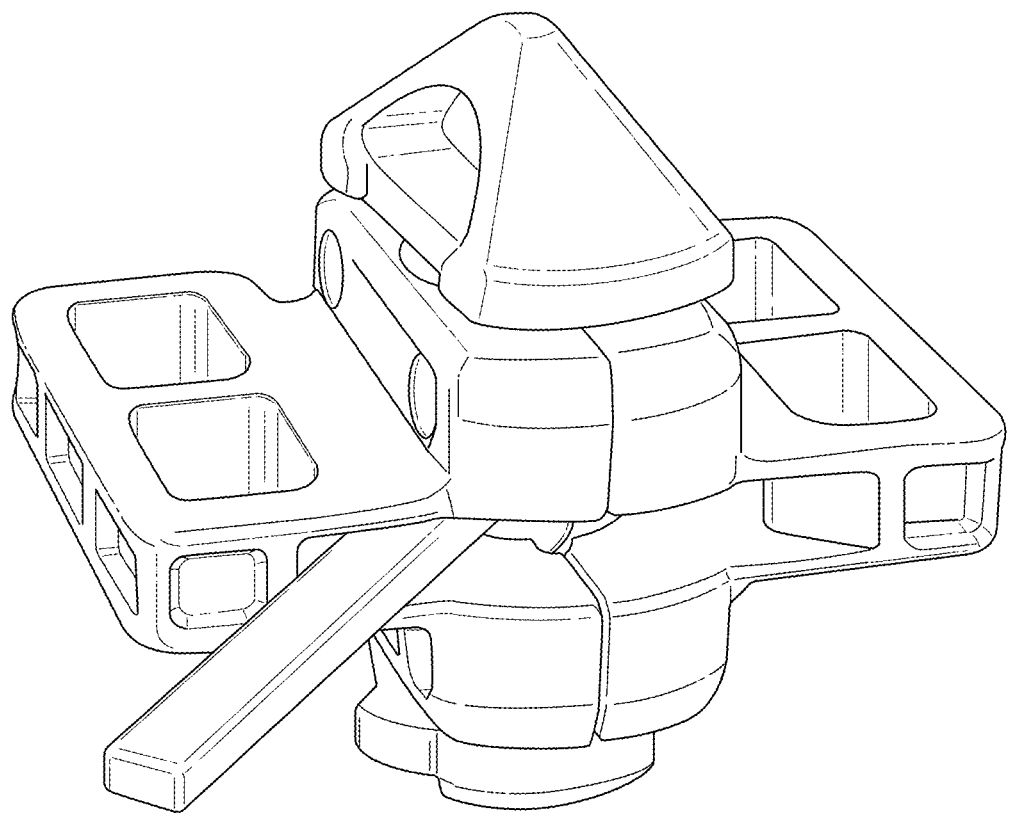
FIG. 9 is a diagram of a Twistlock.

Twistlock: Twistlocks are devices designed to be placed inside the hole of a corner casting and then engaged by rotating the top portion of the device 90 degrees. The device is used to secure the corner casting of a container to another object. An example of a Twistlock is shown in FIG. 9.

Voxel Grid: A Voxel Grid is the result of a voxel filter, which takes a point cloud and analyzes it as a series of boxes which cover the 3D space that the cloud occupies. Each "box" is typically an identical size and is a configurable parameter. Points from the cloud are grouped into each box based on their (x, y, z) coordinate values and data about each box is then stored in arrays, i.e., a Voxel Grid.

Physical Composition of the Invention

According to an embodiment, the physical system of the invention is comprised of at least three major components.

The first component is the measurement device(s) capable of generating measurement points of physical objects in the sensor's field of view and reporting them to other components. The second component is a computing device or devices which can be used both to drive the measurement device(s) and to run the software program component of the invention which performs analysis of the plurality of measurement points to generate a landing position. The final component of the system is the device which uses the landing position provided by the computing device(s) to perform the container landing, i.e. some piece of container handling equipment.

Figure 10:
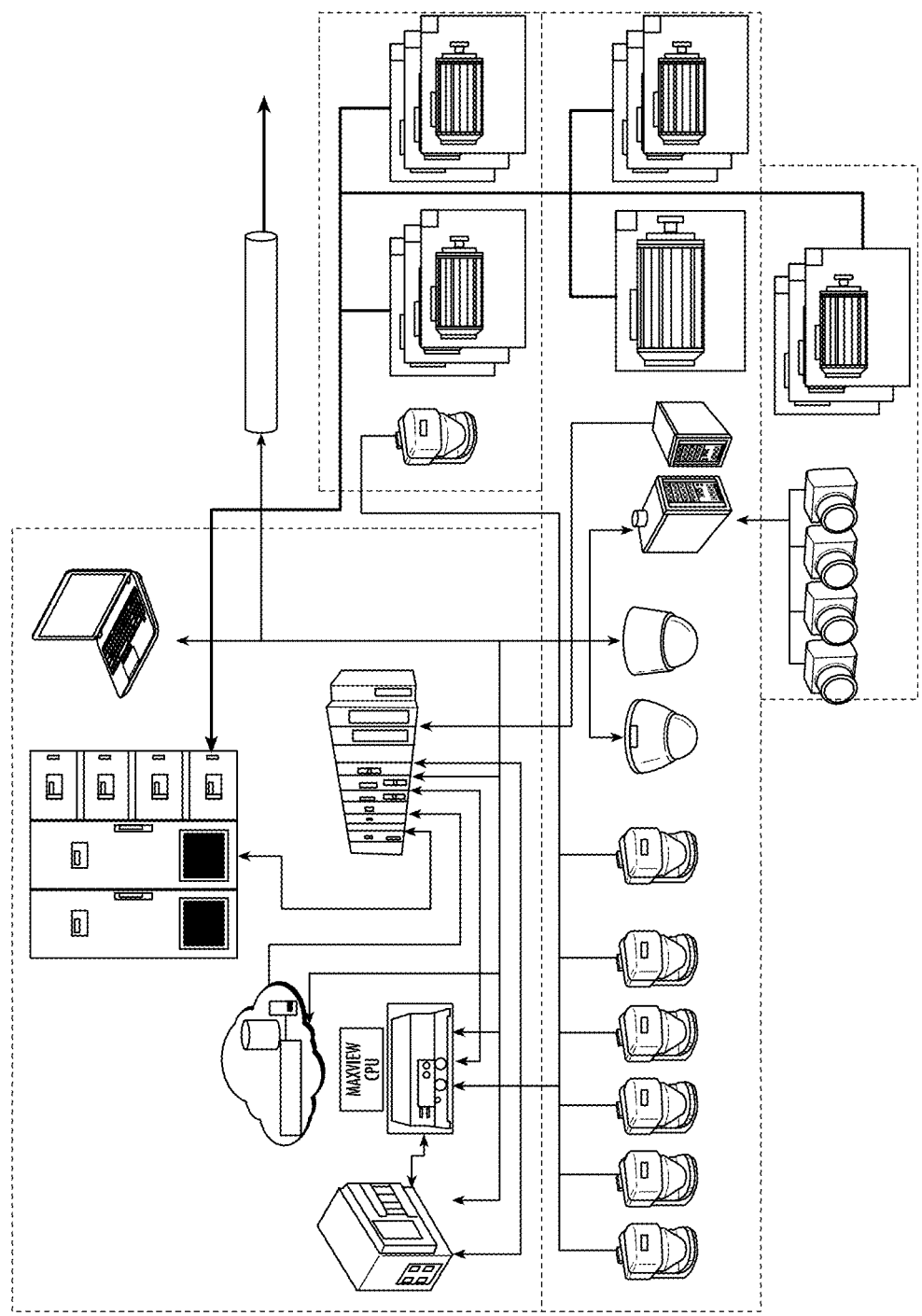
FIG. 10 is a diagram of a System Topology according to an embodiment of the invention.

FIG. 10 shows an example system topology according to an embodiment of the invention. The top left box of the figure depicts the E-House (or Electrical House) which is a substation containing a Programmable Logic Controller (PLC), two Central Processing Units/processors (Maxview® CPU and Maxview4D™ CPU), software (CraneDirector™), and a Crane Management System (CMS) computer, which includes such conventional computer features as a processor, memory, hard drive, graphics processing unit (GPU), and input/output devices such as display, keyboard, and mouse, such as the systems and methods described in U.S. Pat. Nos. 8,686,868 and 7,725,287. The box to the right of the E-House represents the Crane Legs, which include a LiDAR sensor (LMS6) and the left and right Gantry Motors. The box below the E-House and Crane Legs represents the Trolley. The Trolley includes a series of LiDAR sensors (LMS1-LMS5 and LMS7), a Trolley Fixed Camera and a Trolley Pan Tilt Zoom (PTZ) Camera. The Trolley also includes one or more Hoist Motor and one or more Trolley Motors. The box on the bottom right represents the Spreader, which includes a series of Spreader Cameras as well as one or more Micro-Motion Motors. Further, various pathways of operable connection are shown as follows. The black lines represent various paths that control Crane Motion plus feedback. The dark grey lines represent various Supervisory Paths as part of a Supervisory Network which ultimately flows to Connections to Central Location Devices such as a Remote Operating System (ROS), Terminal Operating System (TOS), and Remote Crane Management System (RCMS). The light grey lines represent various control pathways between components, as depicted.

Not shown in FIG. 10 is a non-transitory computer storage media such as RAM which stores a set of computer executable instructions (software) for instructing the processors to carry out any of the methods described in this disclosure. As used in the context of this specification, a "non-transitory computer-readable medium (or media)" may include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM. The non-transitory computer readable media can include a set of computer-executable instructions for providing an operating system as well as a set of computer-executable instructions, or software, for implementing the methods of the invention. The computer-readable instructions can be programmed in any suitable programming language, including JavaScript, C, C#, C++, Java, Python, Perl, Ruby, Swift, Visual Basic, and Objective C.

Figure 11:
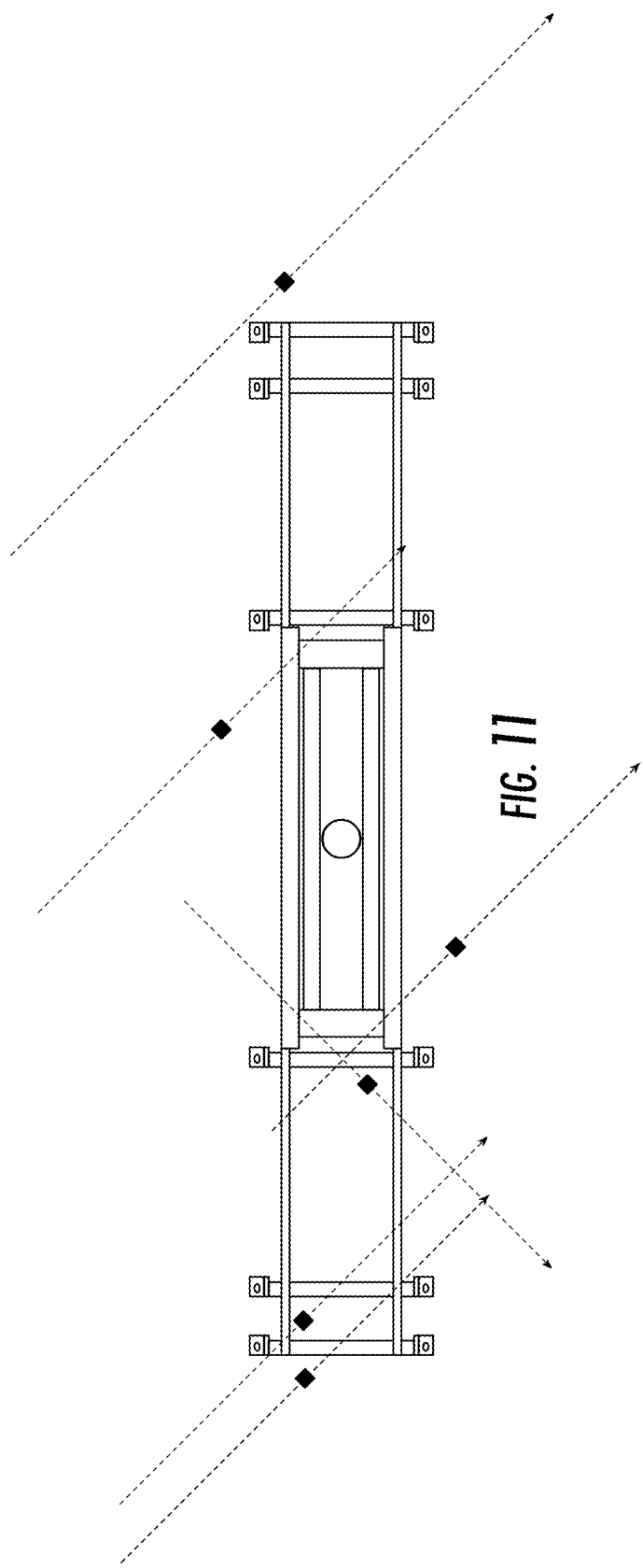
FIG. 11 is a diagram of a Measurement Device Configuration according to an embodiment of the invention.
Figure 12:
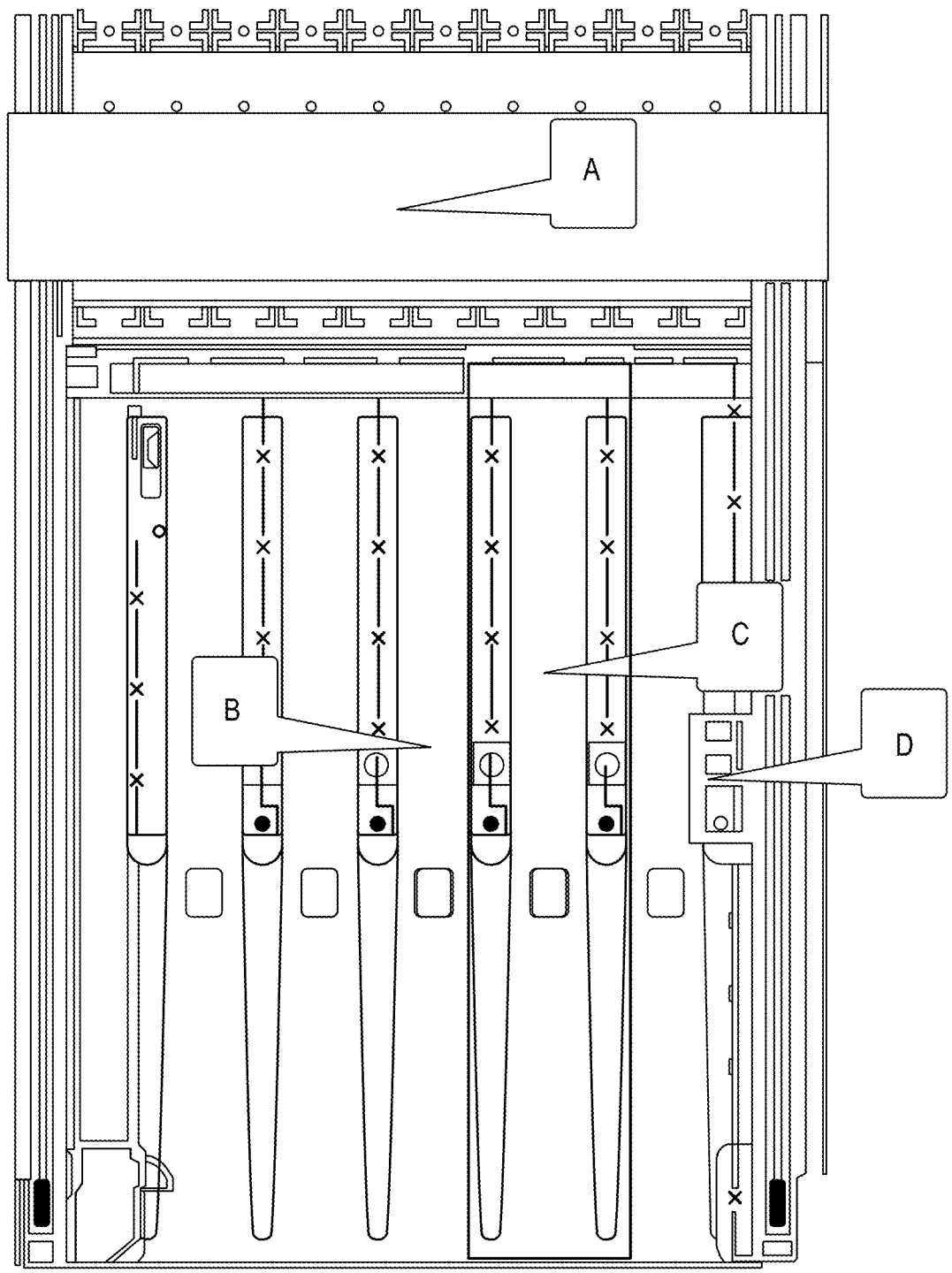
FIG. 12 is diagram of a Landside Transfer Zone.
Figure 13:
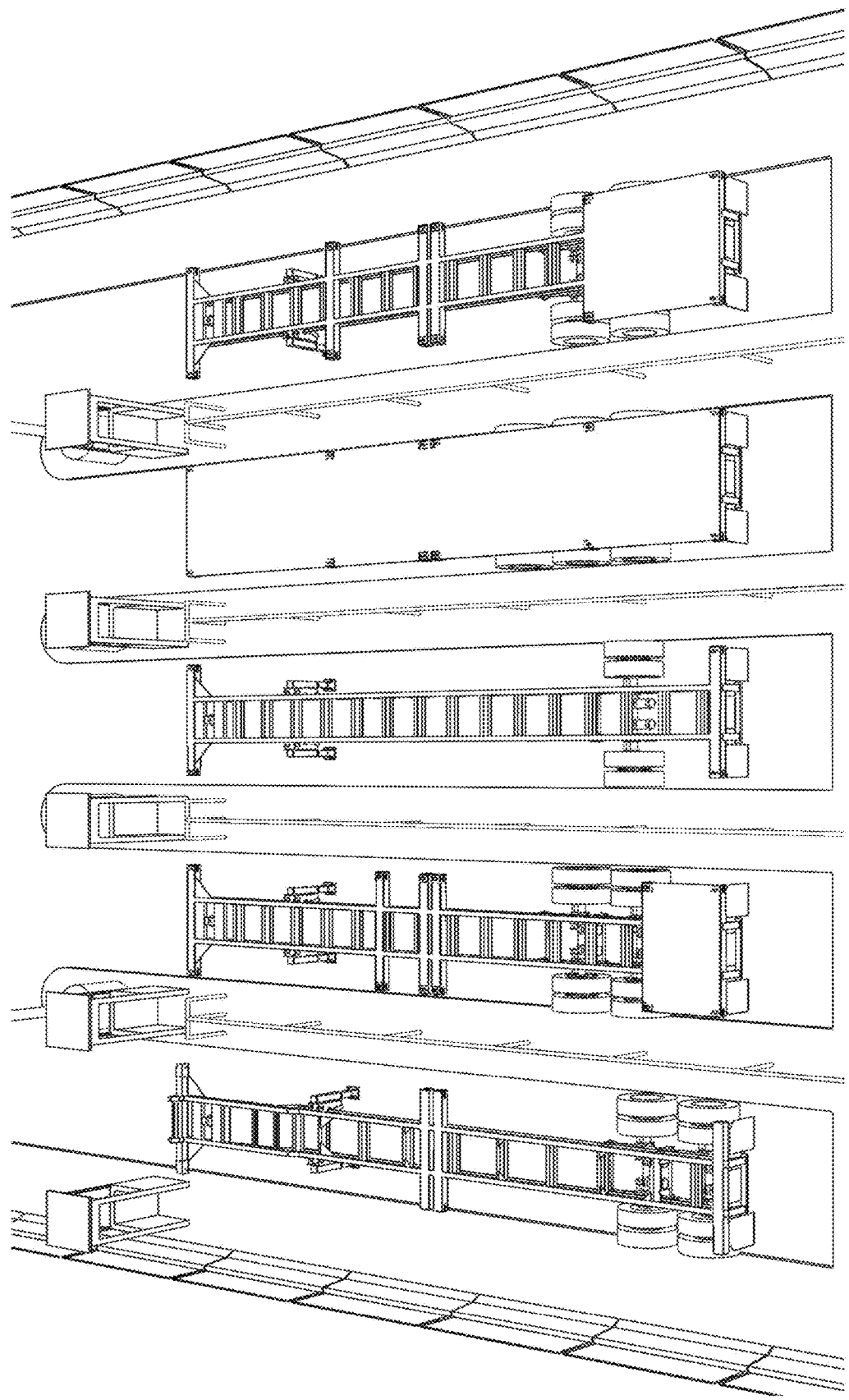
FIG. 13 is a diagram showing Variation in Styles of Chassis.

According to embodiments, the system can be configured in various ways. A first configuration exists with all measuring devices mounted on the crane and reporting all measurements in the crane's operating frame of reference. A second configuration exists with at least one measuring device mounted on the crane itself, reporting measuring points in the crane's operating frame of reference and other measuring devices mounted off the crane reporting measuring points in an arbitrary frame of reference. In embodiments, all, at least one, one or more, or no measuring devices can be located to have a mostly unimpeded view of the target equipment and surfaces disposed below the container handling equipment, such as the landing surface of the target equipment, at some point, no point, any point, or at all points during the measurement collection stages. For example, the collection of measuring devices can together provide a complete or mostly complete view of the landing surface. FIG. 11 shows a configuration in which various LiDAR sensors (LMS1, LMS2, etc.) are positioned on a Crane.

According to embodiments, a third component, the primary device referenced in this disclosure as using the landing position generated by the system described herein, is a type of CHE. According to one embodiment, the specific CHE type is a Rail Mounted Gantry (RMG) Crane or an Automatic Stacking Crane (ASC) which moves 20 ft., 40 ft., and 45 ft. ISO standard shipping containers; however, the system outlined in this disclosure is not necessarily limited to operating only on this type of CHE. Other types of CHE that the system may operate on include Ship-to-Shore Gantry Cranes, Rubber Tired Gantry Cranes, Straddle Carriers, Front-end Loaders, Reach Stackers, Portainers, and the like.

In embodiments, the system relies on the crane to report its own location and relies on the placement of the measurement devices on the crane to be known with respect to the crane's placement to report measurement points of the object with respect to one common point in the crane's frame of reference. The placement of any measurement devices not on the crane do not necessarily need to be known with respect to the crane. The system also relies on the object being operated on (chassis or other equipment) to be visible to the measurement devices and the object to be present within the crane's area of operation.

Operation/Function of the Invention

According to embodiments, operation of the system and methods employed are defined below.

The following describes an Operating Procedure according to an embodiment of the invention.

1. Crane receives job request to land a load on some target chassis.

2. Crane moves to general target location:

For the duration of the crane motion, the system is collecting measurement points, and concatenating them into a point cloud to obtain a view of the scene under the crane, preferably a complete scene under the crane however a partial scene can also be obtained. The system comprises one or more and preferably multiple sensors strategically located to obtain the amount of scene desired for a particular application. Measurement points are obtained from one or more measurement devices and preferably multiple measurement devices mounted on and around the crane, and measurement points are reported to the system as 3D points in the crane's operating frame of reference or an external coordinate system for external devices.

3. Job Valid:

The system then analyzes the scene (point cloud) to determine if the job is valid. The system looks for chassis, containers, prime movers, obstructions, etc. and decides if the items and locations in the landside match the job request and that it can operate (free of obstructions).

4. Pick a Model:
   a. If the system is equipped with a catalog of known chassis variants it will process the current chassis point cloud data and compare it against known variants to find a best fit. The result will be a model point cloud with a target offset from that cloud's center. See "Creating a relative landing position: Teaching the system."
   b. If the system is equipped with one or more extra sensor providing high resolution data of the chassis, the system will process the high-resolution data to determine the target landing offset from the cloud center. The result will be a model point cloud with a target offset from that cloud's center. See "Creating a relative landing position: Analyzing surface features in high resolution."

5. Perform landing solution generation:

Then the system generates a landing solution using methods described in the section "Methods of Landing Solution Generation for Loads on Landing Surface," in the crane's operating coordinate system, of where to place the container to successfully mate with the chassis landing surface.

6. The crane's regulation system then takes the spreader/spreader-container combo to the requested location.

Parts 4 & 5 above references the portion of the procedure which is described in this disclosure.

Figure 17:
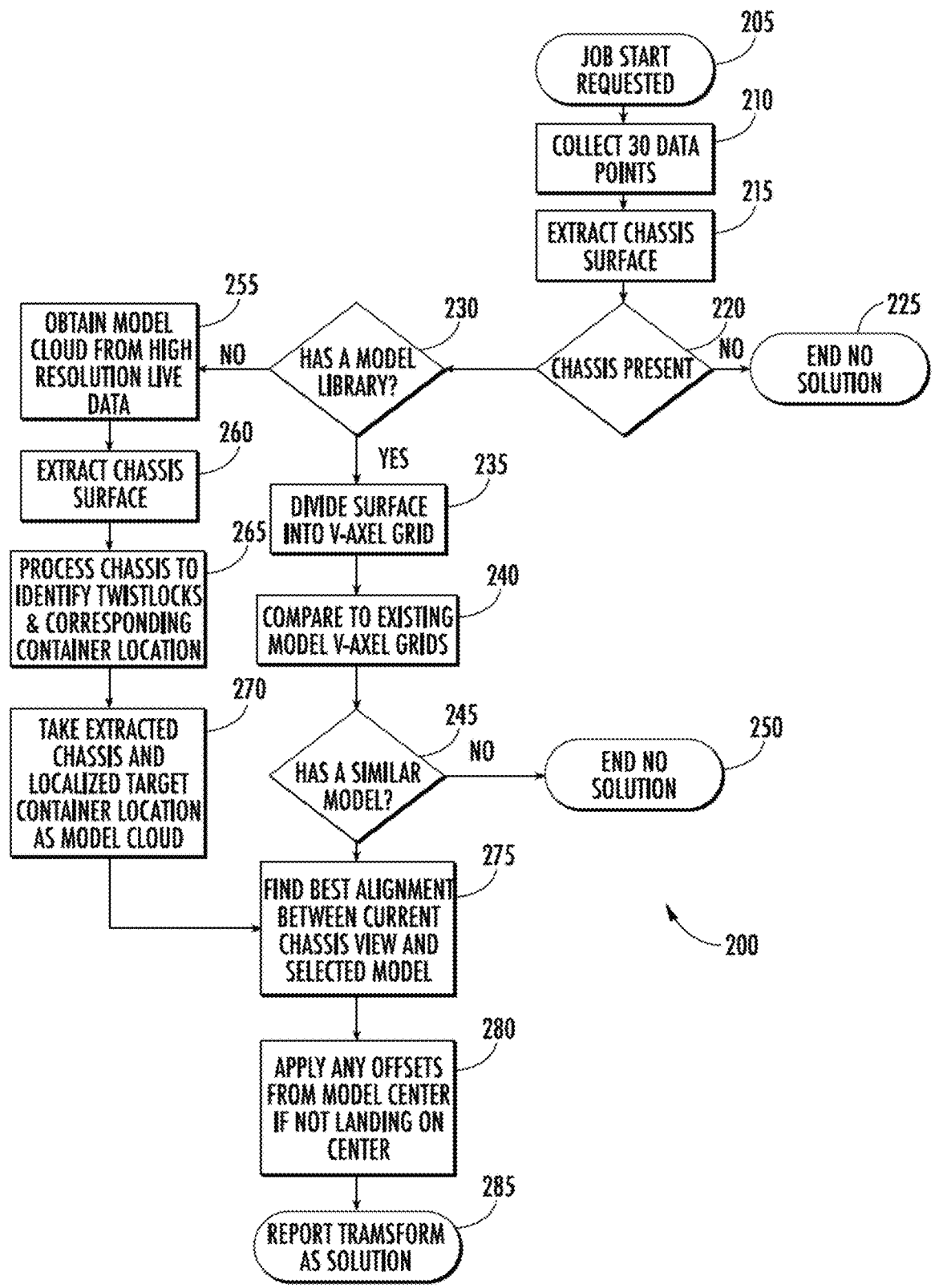
FIG. 17 is a flowchart of an Example Operating Procedure according to an embodiment of the invention.

A flowchart of an Operating Procedure according to an embodiment of the invention is shown in FIG. 17. The process 200 begins when a job start 205 is requested. Then, the system collects 3D data points 210, and from these points extracts the Chassis Surface 215. At this point, the system determines whether a Chassis is present 220. If the system determines that a Chassis is not present, then the process ends with no solution 225. If the system determines that a Chassis is present, it queries the Model Library to determine whether the Chassis has a corresponding chassis in Model Library 230. If there is a Model Library, the system first divides the Surface into a VoxelGrid 235. Then the system compares the VoxelGrid into Existing Model Voxel Grids 240. The system then determines whether there is a similar model of chassis 245. If there is not a similar model of chassis, the process ends with no solution 250.

If there is not a model library, the system obtains a Model Cloud from high resolution live data 255. The system then extracts the Chassis Surface 260, and processes the target equipment to identify structure possibly relevant to mating an object with it or landing the object on a landing surface of the target equipment. In this embodiment, the system processes the Chassis to Identify Twistlocks and the Corresponding Container Location 265. After this step, the system takes the extracted Chassis and localized target Container Location as the model cloud 270 and the model can be included in Model Library 230 for future reference, and/or used in further analysis, such as in an iterative closest point (ICP) analysis.

Then, if there is a similar model, or once the system takes the extracted Chassis and localized target container location as the model cloud, the system finds the best alignment between the current Chassis view and the selected model 275. The system then applies any offsets from the model center if not landing on the center 280. The system then reports the transform as the solution and the process is completed 285.

Methods of Landing Surface Analysis

According to embodiments, the methods employed for Landing Surface Analysis are completed in the following stages:

1. Create a relative landing position. Two options:
   A. Teach the system where to put a container and create a stored model point cloud for future reference.
   B. Analyze the landing surface features, optionally in high resolution, to create a model point cloud on the fly.
2. Figure out what model point cloud and relative landing position to use on the current landing surface.

Creating a Relative Landing Position: Teaching the System

In embodiments, "teaching" is the process of using the crane and sensors (measurement devices) to determine the location of a load on a landing surface in the crane's operating frame of reference, then gathering a super-sampled set of measurement points of the unloaded chassis and saving the two pieces of information into the system.

According to embodiments, the system does not need to know the exact location of the twistlocks, or any other feature of a landing surface, to provide a valid landing solution for a container on a piece of equipment. The system needs only to know where, in relation to some common point on the landing surface, to place a container so that it will mate appropriately with the twistlocks (should the landing surface have them), or so that the container will rest appropriately on the surface. The following section outlines the process for determining the landing locations for a given road chassis, but the same process is applicable to other forms of equipment having a landing surface which can receive a container or any other object. The landing surfaces need not have twistlocks for the process to remain applicable.

Figure 18:
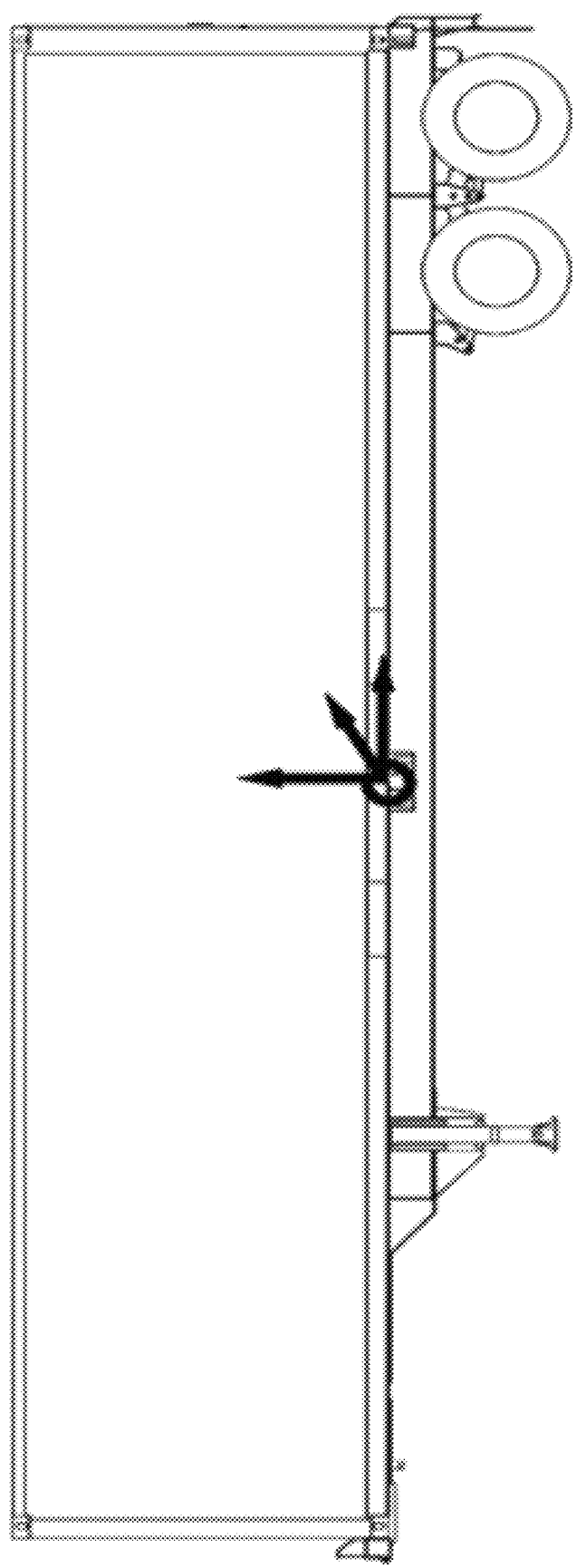
FIG. 18 is a diagram of a Chassis with Container and Known Position.

In one embodiment, the process of "teaching" the system where to place a container onto any given landing surface begins by placing a chassis in a stationary position under the crane with a container correctly and precisely placed on it. After a container has been carefully placed onto the desired location of the landing surface, the system generates a precise location of the container within the crane's operating frame of reference (for example, see FIG. 18). This location can be obtained by any means if the position of the container is known precisely within the crane's operating frame of reference. Most typically however, the system generates the location of the container using the measurement device(s) which are located on or near the crane. To do this, the system collects measurement points from one or more measurement devices as the crane moves over the top of the container to generate a plurality of measurement points, reported as Cartesian coordinates in the crane's operating frame of reference, representing the top of the container. The system then processes this set of measurement points (e.g., a point cloud) producing a precise location of the container within the crane's operating frame of reference (FIG. 18).

In embodiments, this location can be accurately generated and with relative ease because shipping containers are well defined in ISO standards (ISO 668) with respect to their width, height, and length. Typically, ISO standards stipulate the following approximate exterior dimensions for shipping containers:

TABLE I

ISO Container Specifications

| Type | Length | Width | Height |
| --- | --- | --- | --- |
| 10 foot standard | 10 feet | 8 feet | 8 feet, 6 inches |
| 20 foot standard | 20 feet | 8 feet | 8 feet, 6 inches |
| 40 foot standard | 40 feet | 8 feet | 8 feet, 6 inches |
| 40 foot high cube | 40 feet | 8 feet | 9 feet, 6 inches |
| 45 foot high cube | 45 feet | 8 feet | 9 feet, 6 inches |

From a data processing perspective, the container itself is a rectangular box. Since the container's general position is known, and its characteristics are well defined, calculating its position with 6 degrees of freedom (6DoF) can be performed with model matching, line extraction, plane fitting, etc.

Figure 14A:
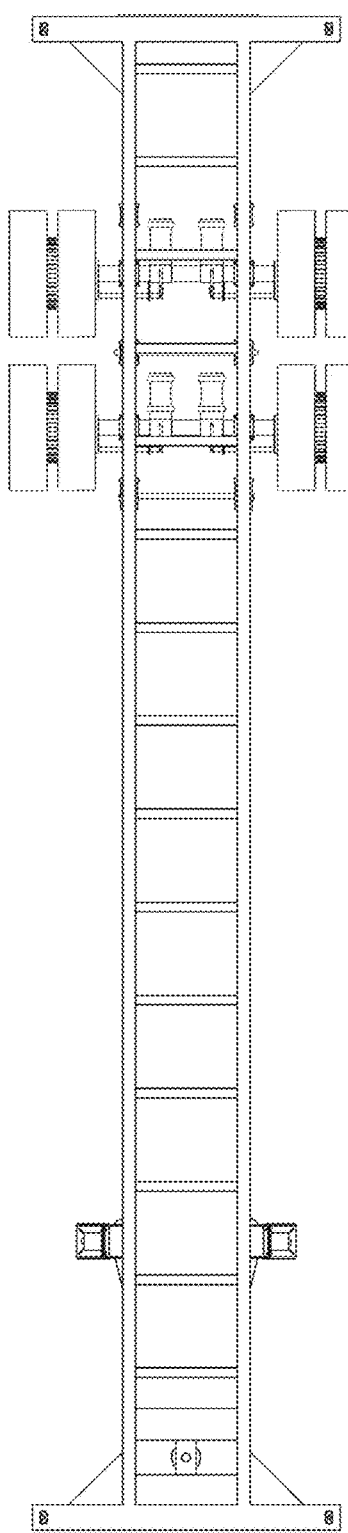
FIGS. 14A-C are diagrams of a Chassis and its Model Cloud according to an embodiment of the invention.
Figure 14B:
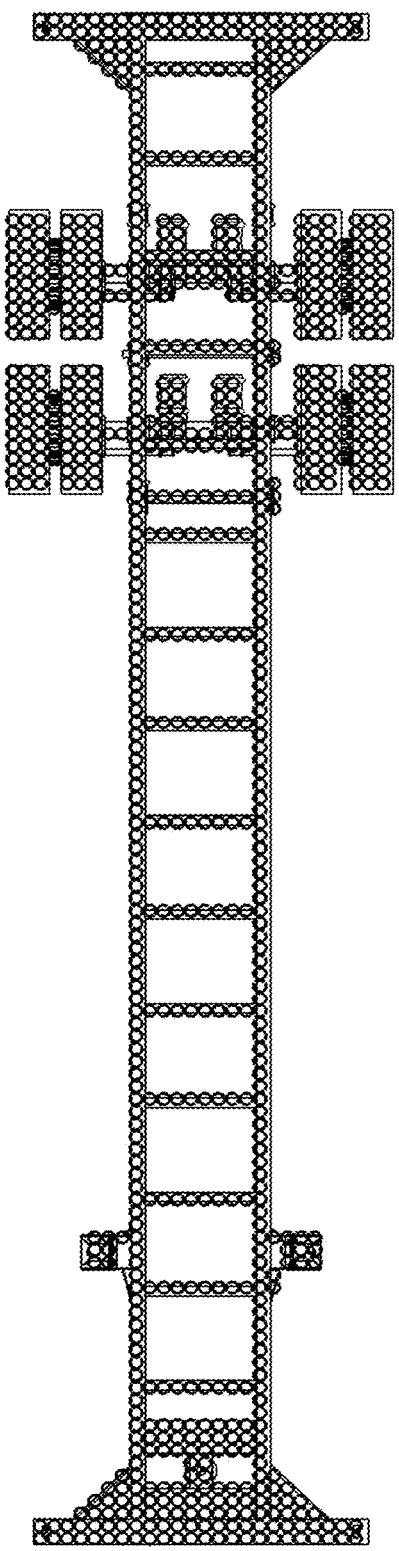
Figure 14C:
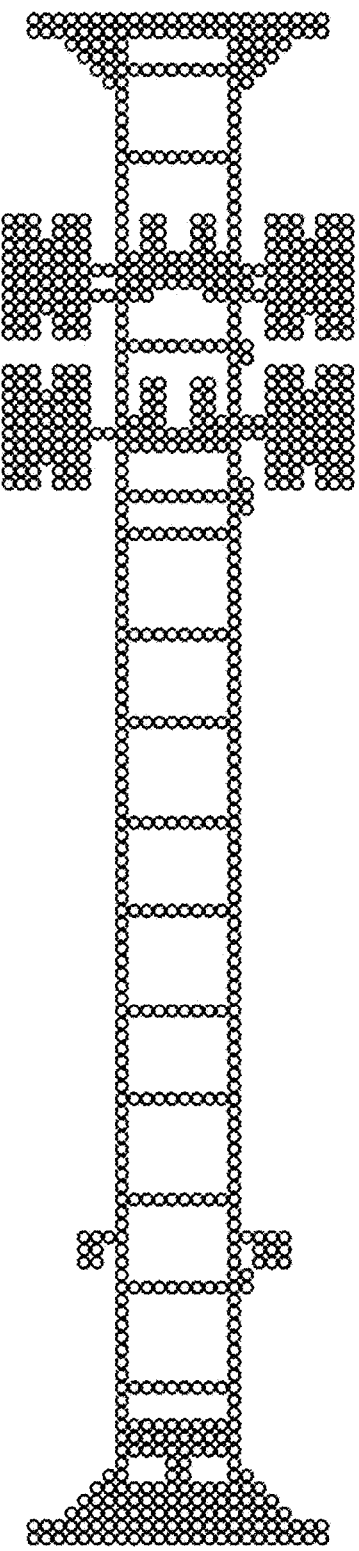
Figure 15:
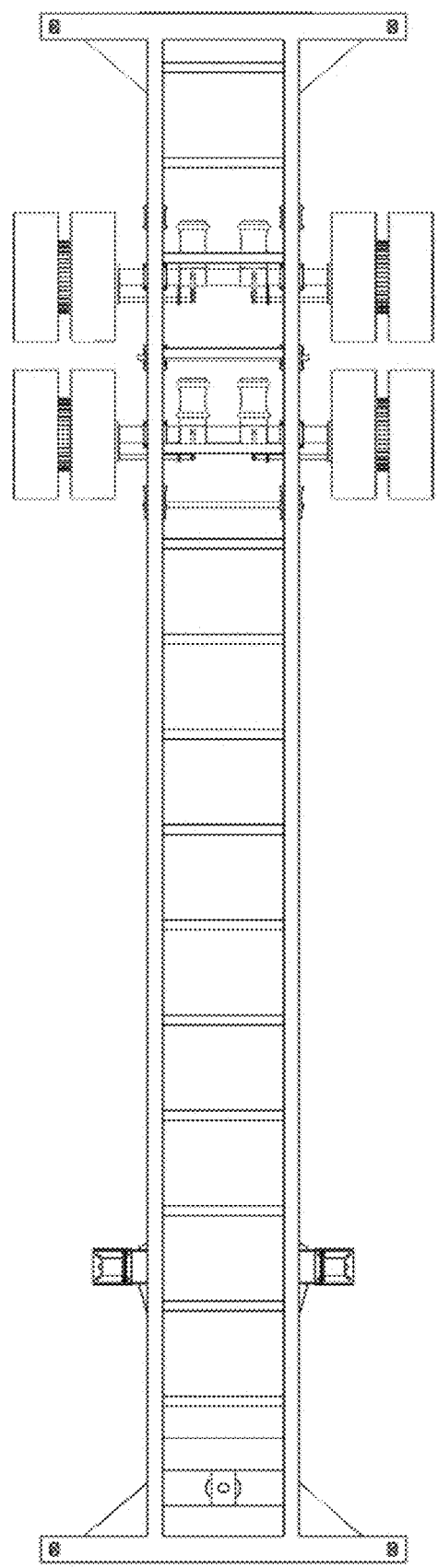
FIG. 15 is a diagram showing a Chassis Top View.
Figure 16:
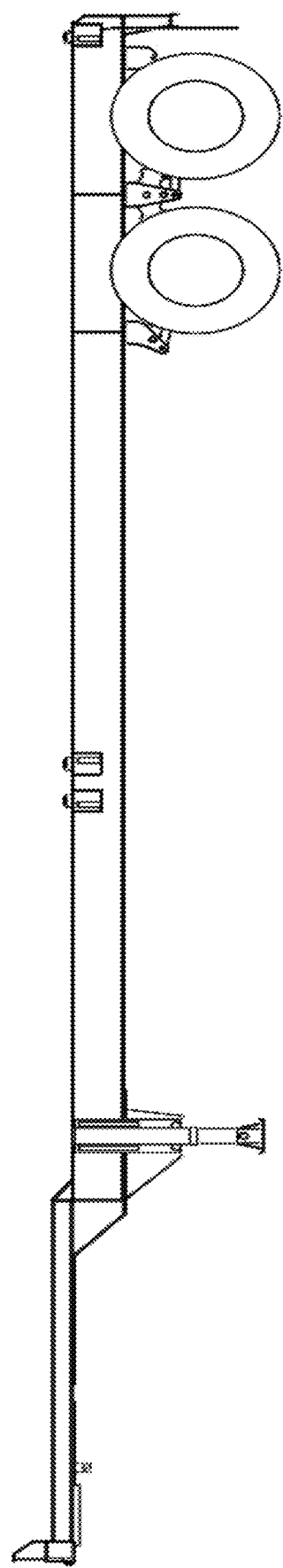
FIG. 16 is a diagram showing a Chassis Side View.
Figure 19:
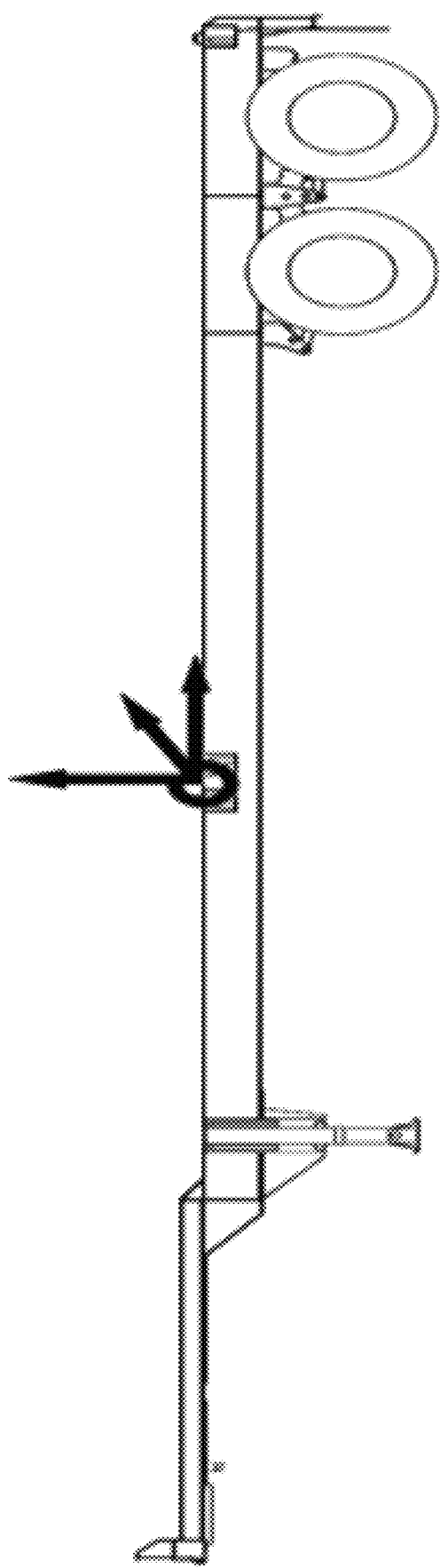
FIG. 19 is a diagram of a Chassis with Known Load Position.
Figure 20:
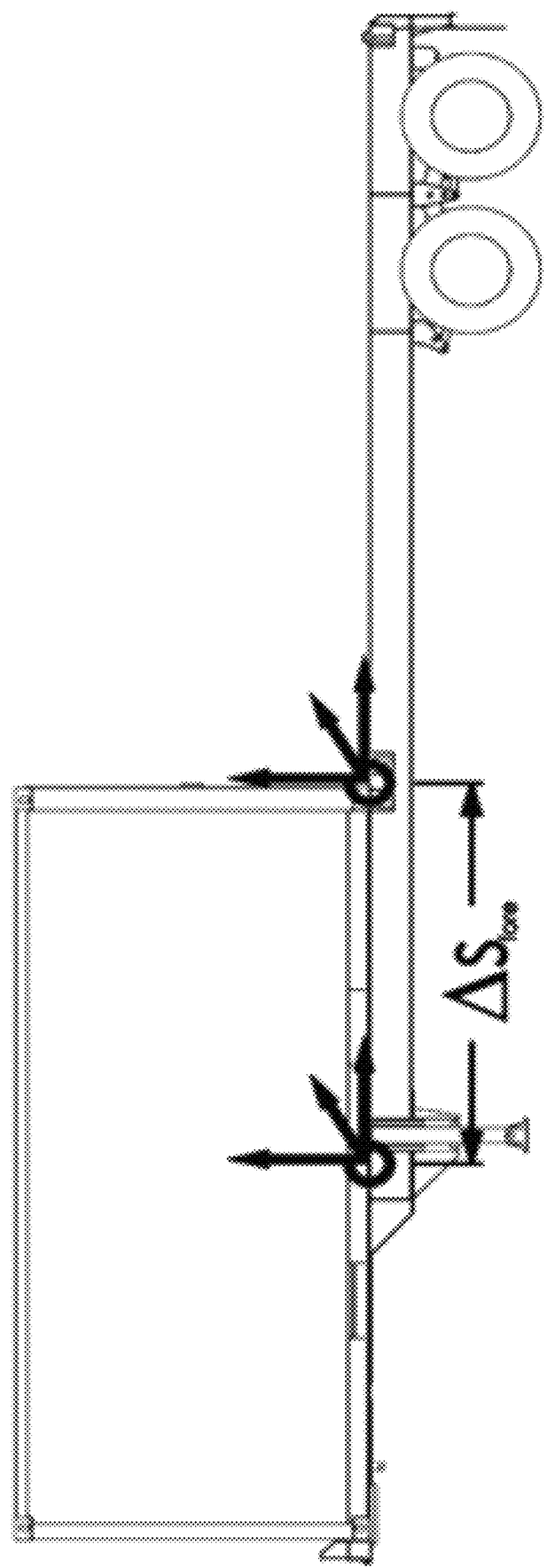
FIG. 20 is a diagram showing Determining Front Container Offset according to an embodiment of the invention.
Figure 21:
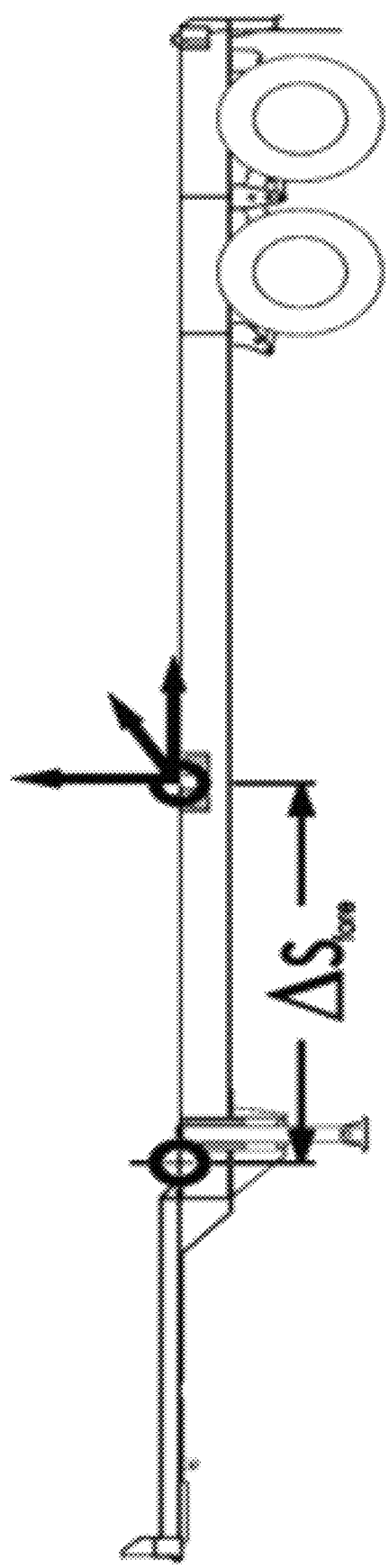
FIG. 21 is a diagram of a Chassis with Front Container Offset according to an embodiment of the invention.
Figure 22:
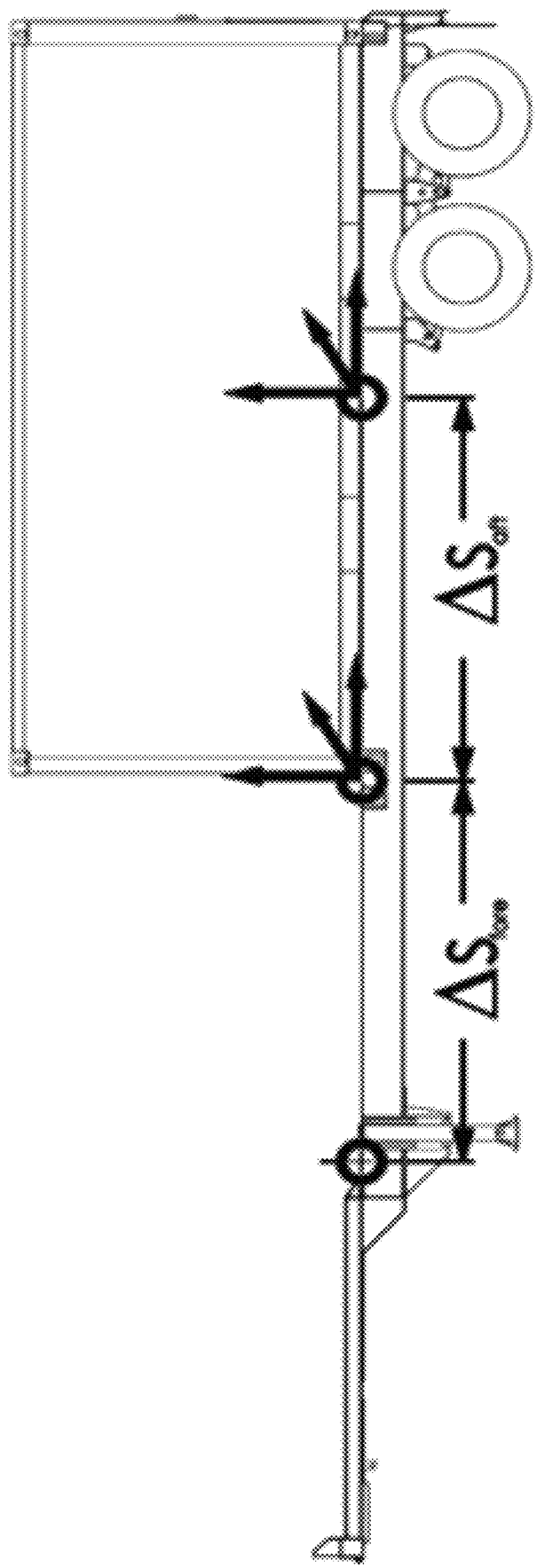
FIG. 22 is a diagram showing Determining Rear Container Offset according to an embodiment of the invention.
Figure 23:
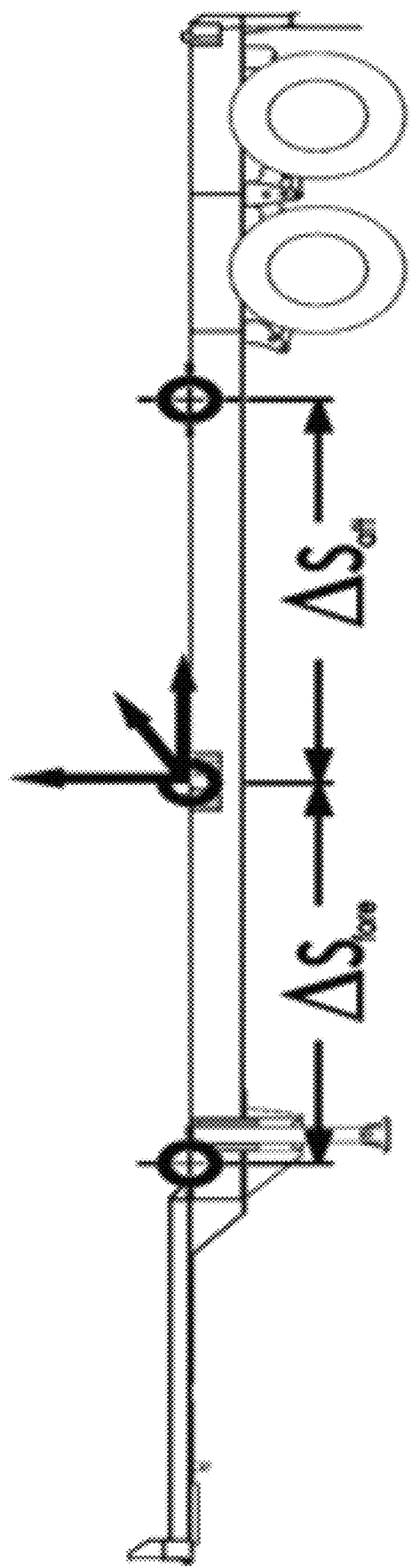
FIG. 23 is a diagram of a Chassis with Front and Rear Offsets according to an embodiment of the invention.

According to embodiments, once the exact position of the container has been determined, the container is then carefully removed from the landing surface of the chassis, so as not to disturb the location or orientation of the landing surface. Subsequently, like the process mentioned above, the system collects measurement points, reported as Cartesian coordinates in the crane's operating frame of reference, from one or more measurement devices located on or near the crane as the crane moves over the top of the empty chassis to generate a plurality of measurement points (e.g., a point cloud) representing the shape of the landing surface. In this stage, however, the crane can be moved over the surface of the object a single time, such as very slowly, or multiple times in such a manner as to create a very dense set of measurement points. Filtering the measurement points using information about the known configuration of the area under the crane and of the presumed landing surface height, the system then extracts the points representative of only the landing surface as in FIGS. 14A-C. The extracted points are then saved into the system as a "model" of the landing surface. Along with this model cloud, the previously extracted container position is saved into the system as in FIG. 19. Using the model cloud, which is now saved as a collection of measurement points which exist in the crane's operating frame of reference, and the known position of the container which is now saved as a coordinate in the same frame of reference, the system can know exactly where a container should be placed onto this landing surface.

In embodiments, at this point the system has stored within itself a 3D point cloud "model" of the landing surface with a known target position where a container should be placed on the landing surface. The location of the largest container that the landing surface can carry is, for the sake of this system, regarded as the "center" of the landing surface. Accordingly, the 3D model is shifted such that its coordinate center (0,0,0) is the target location for the largest eligible container the chassis can carry. This leaves a 3D point cloud model of the chassis with a known container target location for its largest eligible container, namely the origin.

According to embodiments, for chassis types which support carrying multiple sizes of containers, offsets can be determined and recorded so that landing locations for various sized containers are known for a given landing surface. To create multiple landing locations for a single landing surface, the system analyzes a landed container at each of the eligible locations on the landing surface, one at a time, and determines each container's position using the same method as outlined above. The system takes a difference between the location of each subsequent container from the first (largest) container and that difference between locations is recorded and stored as an offset from the "center" of the chassis. This process results in all other landing locations being known relative to the landing location of the first container analyzed on the landing surface. Examples of such offset determination are shown in FIGS. 20-23.

In embodiments, at the end of this process the system has stored at least one "model" of a landing surface and positions, relative to the "center" of that surface, for which to place containers. This process can be repeated for any number of chassis or other equipment to generate a library of models for which the system knows how to operate on.

One added benefit of this method is that the data collected in the "teaching" stage if collected correctly, is not specific to one crane and may be used by the system as implemented on any CHE. Often, a model cloud collected for one chassis is also applicable to other chassis in the same "class" (sharing key features).

Figure 24:
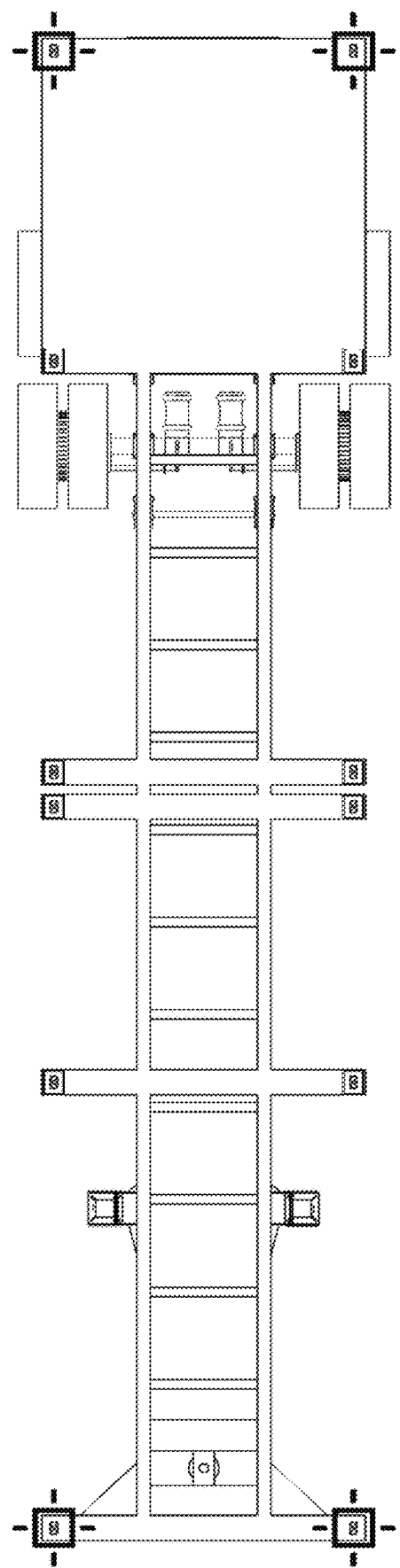
FIG. 24 is a diagram of a Chassis with 40 ft. Twistlocks Engaged and Detected according to an embodiment of the invention.

Creating a Relative Landing Position: Analyzing Surface Features in High Resolution According to embodiments, the system of the invention can also use higher resolution data, obtained from measurement devices located off the crane at positions much closer to the landing surfaces, to find the landing position for a container using key features on the chassis such as guides, targets, raised twistlocks, or recessed twistlocks as shown in FIG. 24.

Figure 25:
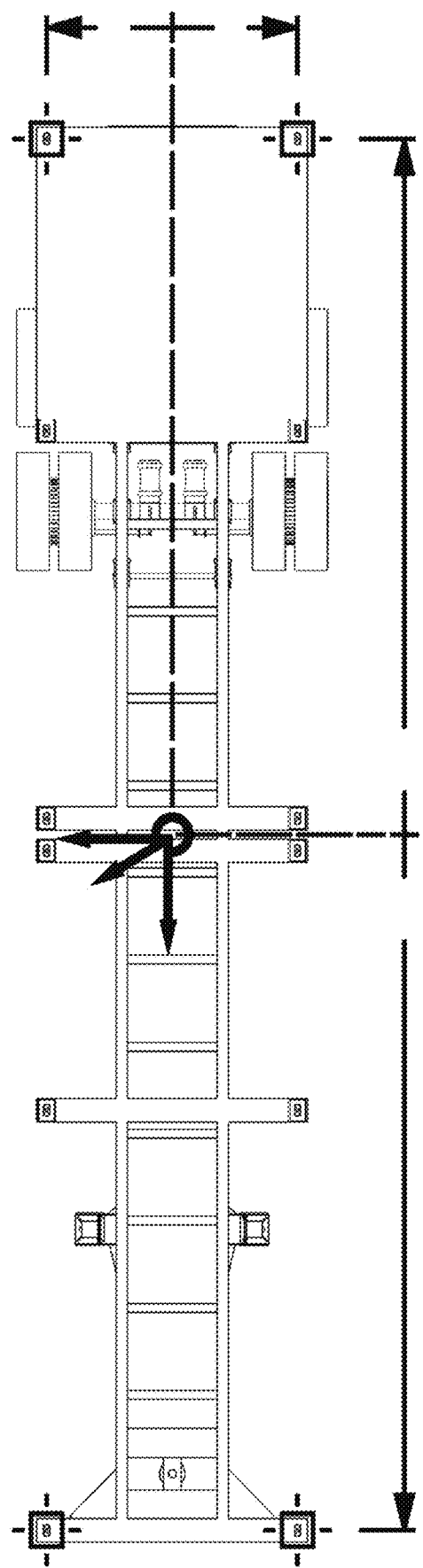
FIG. 25 is a diagram of a Chassis with Detected Twistlocks and Container Target Location/Orientation according to an embodiment of the invention.

This may be necessary in situations which the devices mounted on the crane cannot provide enough detail to make functioning models of the intended landing surfaces or in instances when other factors prevent "teaching" to be a reliable method of generating landing solutions. The system scans the chassis with a measurement device which is mounted at a location close enough to the landing surface to produce a plurality of measurement points (e.g., a point cloud) in which key features of the landing surface are distinguishable and reports the points back to the computing device which collects them and then analyzes the collection. The system takes the collection of measurement points and filters down to only the landing surface as in the "teaching" stage and then it looks along the landing surface for all distinguishing features of the chassis and catalogs them. The system uses local minima and local maxima searching along the chassis surface to determine the locations of the raised and recessed twistlocks and catalogs the location of all of the possible landing point locations. Then, using the geometric constraints imposed on the location of landing points by the ISO standards for the corner casting locations of a container the system finds the most appropriate locations and reports the overall landing location for the container as their mathematical center as shown in FIG. 25. Other techniques that can be employed include model convolution. Mathematically speaking, convolution is the "integral of pointwise multiplication," and convolution filters are used in radar, etc. for identification of echo signals. Convolution filters utilize an a priori knowledge of the expected shape of the (wave, twistlock, etc.) to help better discriminate that shape from noise.

The system then, as done in "teaching" takes the discovered landing location for the surface and the landing surface measurement point collection and saves the two pieces of information as a model with its local origin as the overall landing location. This model can be saved, such as to the long-term memory of the system however, it can instead or in addition be passed directly to the methods for generating a landing solution.

Finding the Right Measurement Point Model to Use

The section "Creating a relative landing position: Teaching the system" defined a method to create and store a collection of measurement points, centered around the landing position of the largest container that the respective surface can accept and associated offsets for all other containers that the surface can accept. Once a plurality of models has been stored in the system, it is necessary to have a method to choose the correct model to be applied to a given operation. This section will outline the steps taken in the system to perform the choosing operations for a given current set of measurement points to select the best fit match of the stored models.

According to embodiments, after the method of "teaching" the system how to land on a certain piece of equipment has been performed, the system collects information about that piece of equipment through analysis of its landing surface as represented by the collection of measurement points which are reported by the measurement devices, of which at least one is mounted on the crane itself. The process for obtaining the representation of the landing surface and finding its associated landing locations is described above. This process is completed, for at least one representative of each piece of equipment belonging to a class of equipment, which the system will be expected to operate on, prior to performing an actual landing operation for a piece of equipment.

Figure 26A:
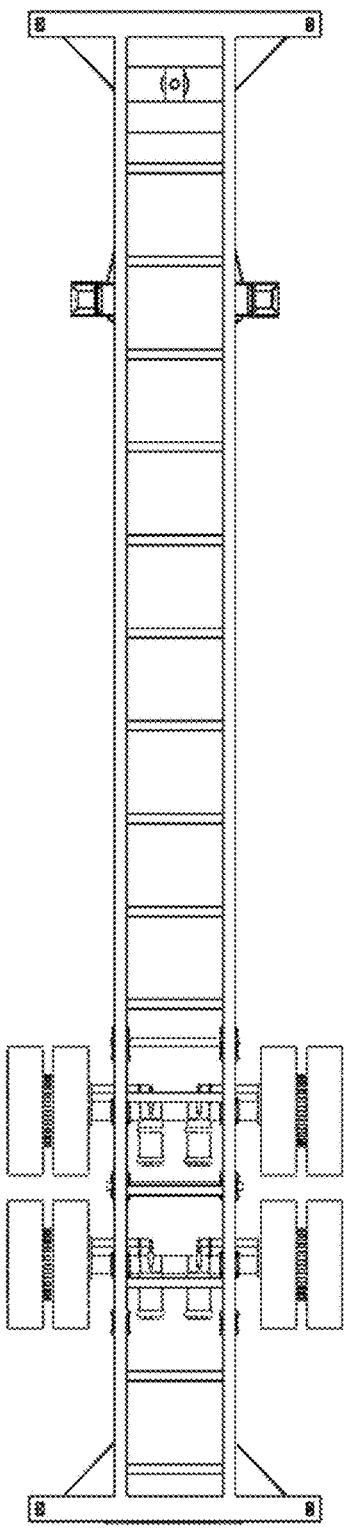
FIGS. 26A-C are diagrams showing Chassis Variations.
Figure 26B:
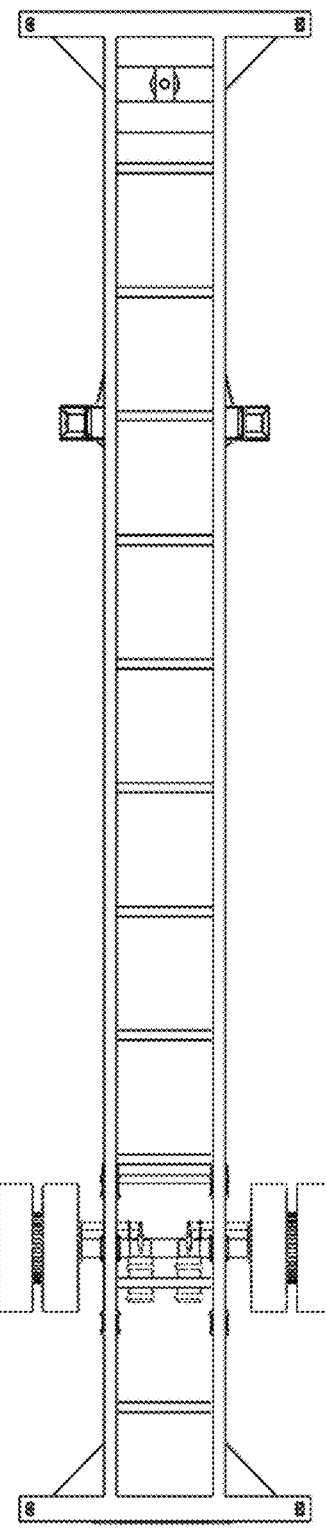
Figure 26C:
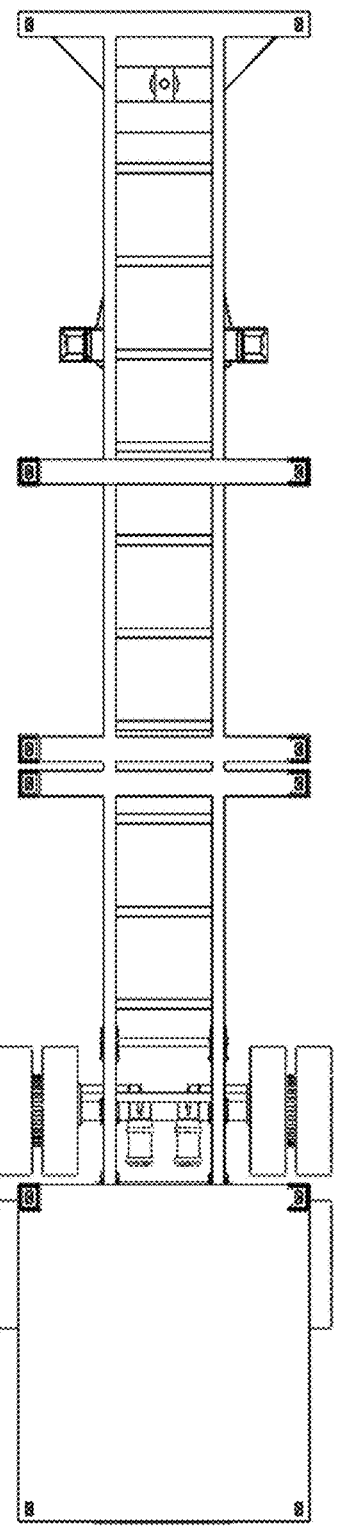

Classes are collections of attributes that categorize equipment into groups, wherein all members of a particular group share the same or similar landing positions. Classes are typically comprised of structural attributes, such as girder locations and support members, as opposed to largely cosmetic attributes, such as landing gear location and axle arrangements. The landing positions for objects within a class should be the same. An example would be the skeleton chassis seen in FIGS. 26A-C. Of the three chassis shown in FIGS. 26A-C, the leftmost chassis are in a single class. They both share landing positions, on the landing surface, which are sufficient for one 40 ft. container to lock onto the chassis at the front and rear extremes simultaneously, these two chassis can only carry a 40 ft. container. The first and second chassis look similar in that their overall shape is the same and their major members for supporting the container load are in roughly the same locations, however, the smaller cross members are in different locations as shown in and the wheels and landing gear are different. The third chassis belongs to a second class because unlike the first two, it allows for two 20 ft. containers to land on the chassis and is also capable of carrying a single 40 ft. container load. In the system, it would be required to have one model of either the first or second chassis and another separate model of the third chassis.

Figure 27:
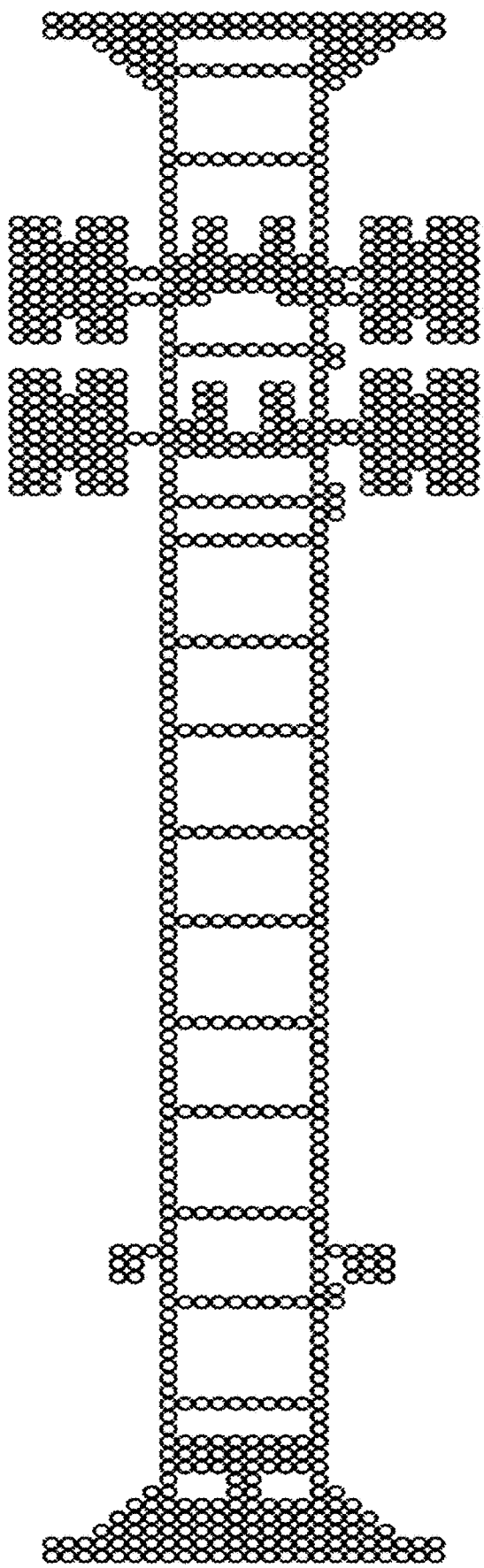
FIG. 27 is a diagram of a Model Cloud of a Chassis according to an embodiment of the invention.
Figure 28:
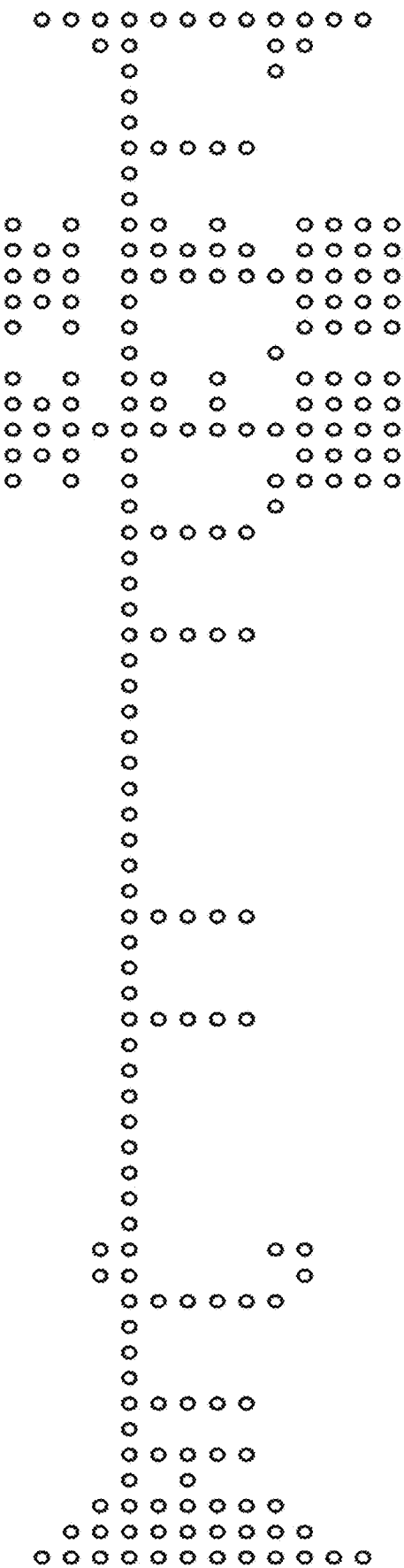
FIG. 28 is a diagram of a Current Scan Cloud of Chassis according to an embodiment of the invention.

According to embodiments, once the library is filled with a representative of each class of equipment which the crane will be expected to service, the system is then capable of finding a proper match for a given current chassis. In doing this the system collects measurement points, which can be reported as Cartesian coordinates in the crane's operating frame of reference, from one or more measurement devices located on or near the crane as the crane moves over the top of the empty chassis to generate a plurality of measurement points representing the shape of the landing surface, just as it did in the "teaching" stage. Other coordinate systems are equally applicable, depending on the application. For example, cranes that are not gantry cranes, such as luffing, tower, jib, etc., may operate in a cylindrical/polar coordinate system. This time however, the crane only moves over the chassis once. Because of limitations in measurement device resolution/quality, instability in the mechanical features of the crane, and the possible obstruction of the measurement devices' field of view by the load suspended by the spreader hanging from the crane when performing an operation, the data obtained in this manner can be poor quality/noisy. With poor quality data samples, it is typically impossible to detect objects as small as a twistlock or similar with any reliability, therefore calculating a landing position using features of the chassis is impossible. Additionally, with only one pass, depending on the condition of the chassis being operated on, some portions of the chassis may not be visible at all due to obstructions and poor visibility as seen by the measurement devices. Because of these factors, the system may not have a complete sample of the landing surface represented by measurement points. Despite the quality of the data from the measurement devices, the system processes the current chassis measurement data using similar filtering and processing techniques to eliminate all but the representative landing surface from the data provided. The filtered and processed subset of the plurality of measurement points (e.g., point cloud) is then regarded as a cloud for the current view of the landing surface. An example of a densely sampled model cloud can be seen in FIG. 27 and data of a chassis being operated on can be seen in FIG. 28.

Now that the system has a cloud for the current chassis, it can then begin to compare this object to the entire library of stored models by cross referencing it against the library of model clouds and measuring its similarity to known chassis using various metrics and meta data generated about the model clouds and the current cloud. The comparison process begins by taking each cloud of measured 3D points for each item and applying a voxel filter to them.

In embodiments, the voxel filter takes a cloud and analyzes it as a series of boxes which cover the 3D space that the cloud occupies. Each "box" is an identical size and is a configurable parameter. Points from the cloud are grouped into each box based on their (x, y, z) coordinate values and data about each box is then stored in arrays. Types of metadata can include, but are not limited to, a number of points in each box, and greatest z-coordinate value in each of the boxes of the X-Y plane, or whether a given box is occupied.

According to embodiments, once the raw metadata is generated, knowing some basic principles of a landing surface, the system applies some methods to fill in holes where noisy data could be lacking information. The hole filling/noise reduction is only applied to clouds generated of landing surfaces being operated on, as model clouds generated in the "teaching" methods are sufficiently sampled and as such are expected to be free of noise or substantially free of noise. The result of this process is collections of metadata about each stored model cloud as well as the current scan's model cloud.

In embodiments, this metadata is then used in a series of calculations and metrics which are designed to test the similarity of two landing surface objects. In one example, the system determines the length of each landing surface in regard to the largest container which it can accept. Then, the system ignores all landing surfaces which do not match the length of the landing surface currently being operated on. The metadata for the stored landing surfaces remaining is then analyzed for certain characteristics of a surface which can be seen on a macro level and compared to the characteristics which are true of the current landing surface as determined by analyzing its metadata. In embodiments, the characteristics of the surfaces that are considered in the analysis depend on the particular application. The surface characteristics can include, but are not limited to, continuous or discontinuous surfaces interpreted as landing surface; abnormalities in the data perceived as obstructions or defects; features of the landing surface such as the presence or absence of girders, cross members, supports, or guides as well as their spacing and size; and characteristics of the surface profile such as bends, step downs, warping, ramps, etc. which constitute visible or measurable changes in the flatness or profile of the landing surface, or combinations of one or more of these.

In embodiments, each collection of metadata from each eligible model cloud is looped through in turn and compared with the metadata of the current cloud and a confidence score is generated which indicates the level of similarity that a given model cloud has with the current cloud. By comparing the metadata in different ways, a variety of different scores can be generated. Each of these scores can then be weighted and summed, such that an overall score of match confidence is generated. At the end of processing, if a sufficient score threshold is met, the stored model with the highest score is chosen as the match.

Figure 29:
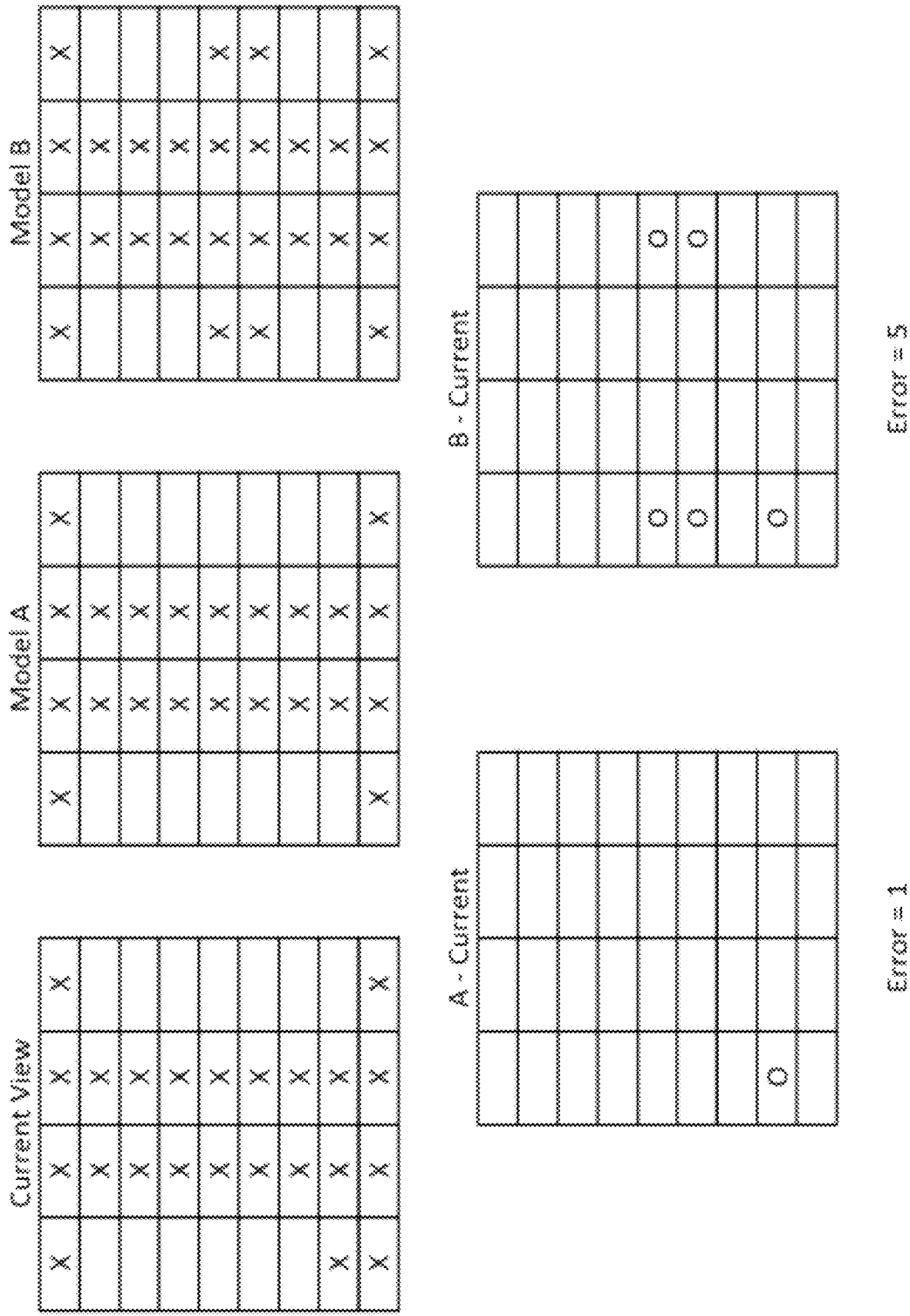
FIG. 29 is a diagram of a Binary Similarity Comparison according to an embodiment of the invention.

An embodiment of a simple metadata comparison is shown in FIG. 29—Binary Similarity Comparison. The top row is representative of the meta data from a current view of a chassis, followed by stored meta data for two known chassis types. This meta data is representative of occupied/unoccupied boxes along the X, Y plane. One way to compare this data is to simply subtract the current view array from the model array. The results of this subtraction are shown in the second row. For model A only 1 box is not commonly occupied in both arrays, while for model B 5 boxes are not commonly occupied. This results in an overall error score for this metric, called a binary similarity, of 1 for model A and 5 for model B.

Figure 30:
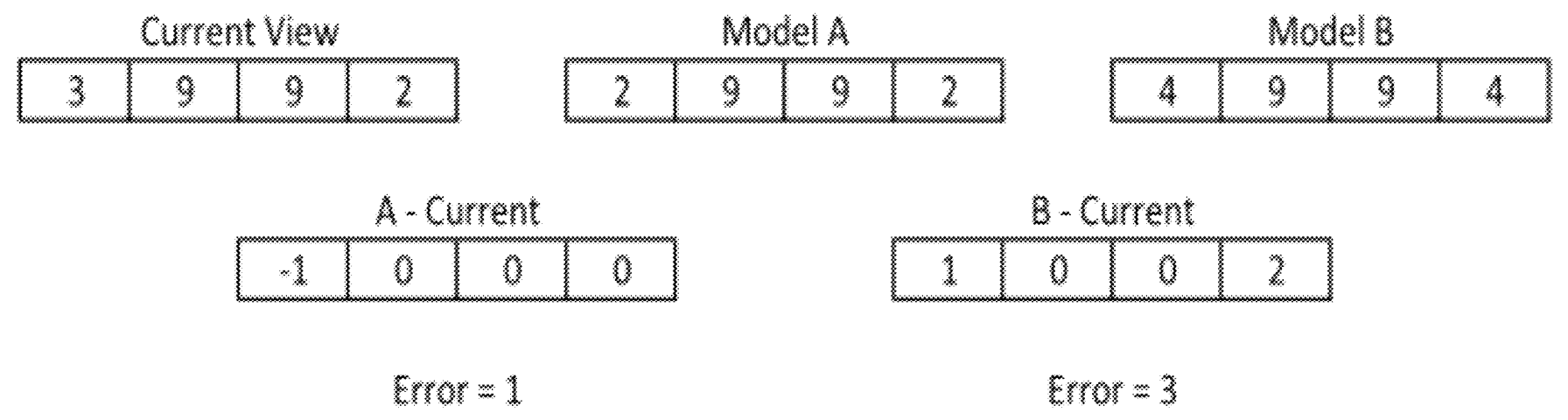

In another embodiment, another way to generate a score from the same meta data is to compress the data along a given dimension and compare again. By summing the number of occupied boxes in each column and comparing the results, FIG. 30—Binary Column Compare is generated. In this comparison, A has a match error of 1, while B now has a match error of only 3.

Now with two sets of scores an overall match likelihood can be generated. Assuming each score is weighted evenly, model A would have a score of 2 while model B would have a score of 7. With the score in this case being match error, the smallest number would indicate a best match. Thus, model A would be chosen as the best match.

According to embodiments, in real applications additional similarity comparisons can be performed to generate many scores, each of these scores can then be weighted and summed to generate a total similarity error and finally the model with the best qualifying score can be chosen. The types of metrics and weights applied are best determined by analyzing the types of objects expected to appear and generating metrics and weighting them accordingly.

Stages of Analysis to Choose Models:
1. Voxel filter
   A. Points in X-Y
   B. Points in Y-Z
   C. Values in X-Y
2. Apply hole filling techniques to current scan, expecting poor data quality
3. Establish length class for each model (10 ft., 20 ft., 40 ft., 45 ft., plus-sized, etc.)
4. Comparing each item in the length class most like the current scan's model cloud on the following topics:
   A. Compare features of each chassis via similarity checks between the two arrays
   B. Generate a similarity confidence score
   C. The model with the highest qualifying confidence score is chosen as the best match According to embodiments, in some cases it has been noted through testing, that certain landing surfaces can lack defining features, when viewed as measurement points taken from above the surface. This makes choosing the correct landing surface from the library of models which matches the current landing surface present under the crane very difficult as there may be no visible distinguishing features between the two surfaces. Despite the lack of defining features in the two views the two surfaces may have vastly differing landing positions for a container.

Take two flatbed chassis for example. The landing surface of two flatbed chassis may be the same width, same length, and same height. Both chassis, when seen from above as measurement points, generate a non-descript rectangle of measurement points which are the same dimensions. For the sake of this example, these are referred to as chassis A and chassis B. Imagine that they are both 42 ft. long and 8 ft. wide (ISO container width and 2 ft. longer than a 40 ft. container). Now, imagine that chassis A has twistlocks appropriate for a 40 ft. container which are placed starting at the front edge of the landing surface. Chassis B has twistlocks appropriate for a 40 ft. container which are placed 1 ft. from the front edge of the chassis. Now say that chassis A and chassis B are "taught" to the system and stored in its library for future use. Because of the 1 ft. difference in starting location for the two sets of twistlocks between the two chassis, if the wrong chassis is chosen later, the container will not land appropriately. Now say later a chassis B2 arrives to receive a box from the crane. This chassis is the same as chassis B, but because chassis A and chassis B both look the same to the system there is no way to determine which is the correct model to use and no way to obtain a solution for the container.

Ambiguity in landing surfaces, such that the correct one cannot be chosen from a library via companion, can be handled by mounting sensors close to the chassis or equipment (such as on the ground or on fixed or mobile equipment or structure) and using methods of analyzing the landing surface in high resolution in order to generate a landing solution by identifying landing points or other distinguishing features from higher resolution data.

Methods of Landing Solution Generation for Loads on Landing Surfaces

In one embodiment, the method defined above, creating measurement point models, is a precursor to generating the landing solution for a container on the landing surface of a piece of container handling equipment unless the system is using analysis of surface features in high resolution. Once a proper model has been chosen, or generated in the case of "Analyzing surface features in high resolution," the model is then passed along to the methods defined below, which use that model combined with the measurement points collected by the measurement device(s) located on the crane of the current chassis to generate a solution. The methods below employ a well-studied process called iterative closest point (ICP) (see Besl, Paul J.; N. D. McKay (1992). "A Method for Registration of 3-D Shapes." *IEEE Trans. on Pattern Analysis and Machine Intelligence*. Los Alamitos, CA, USA: IEEE Computer Society. 14 (2): 239-256) to convert the relative position associated with the measurement point model into an absolute position in the crane's operating frame of reference.

Figure 31:
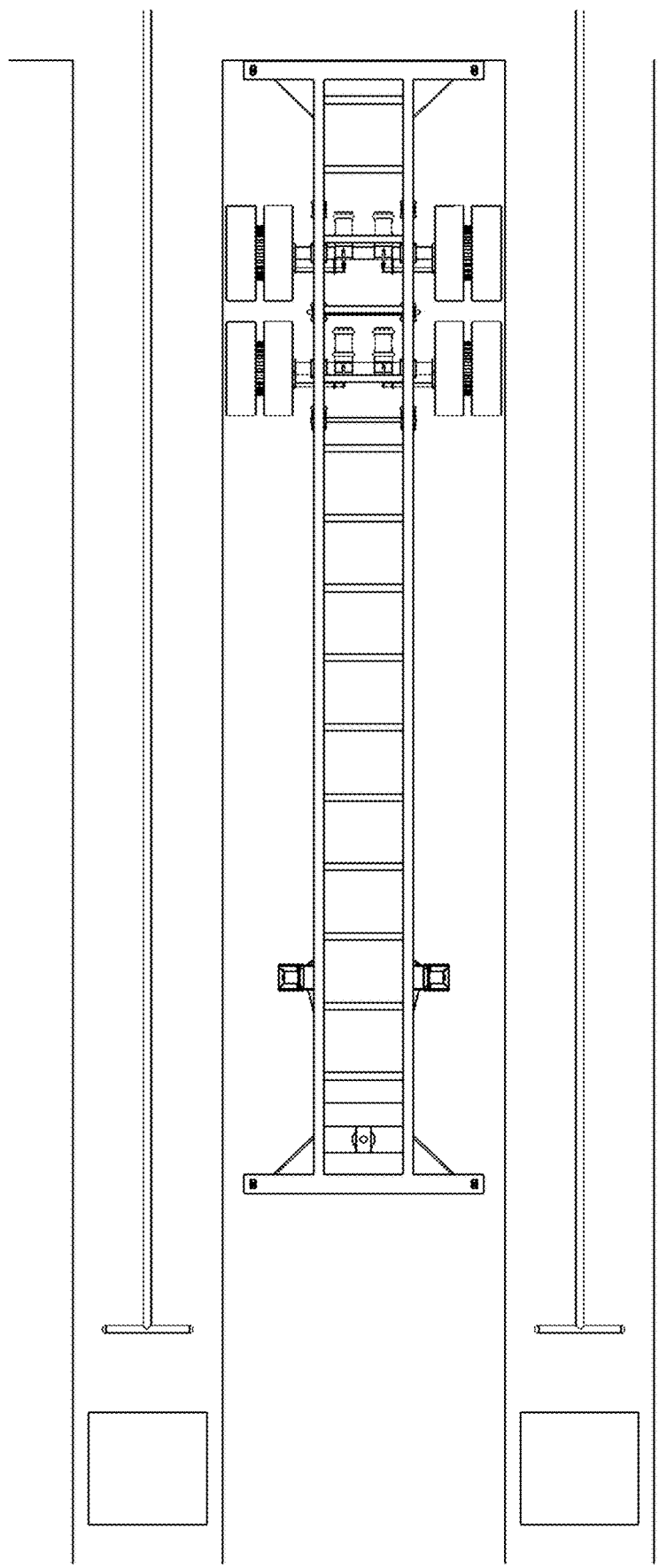
FIG. 31 is a diagram showing Expected Chassis Position in Lane according to an embodiment of the invention.
Figure 32:
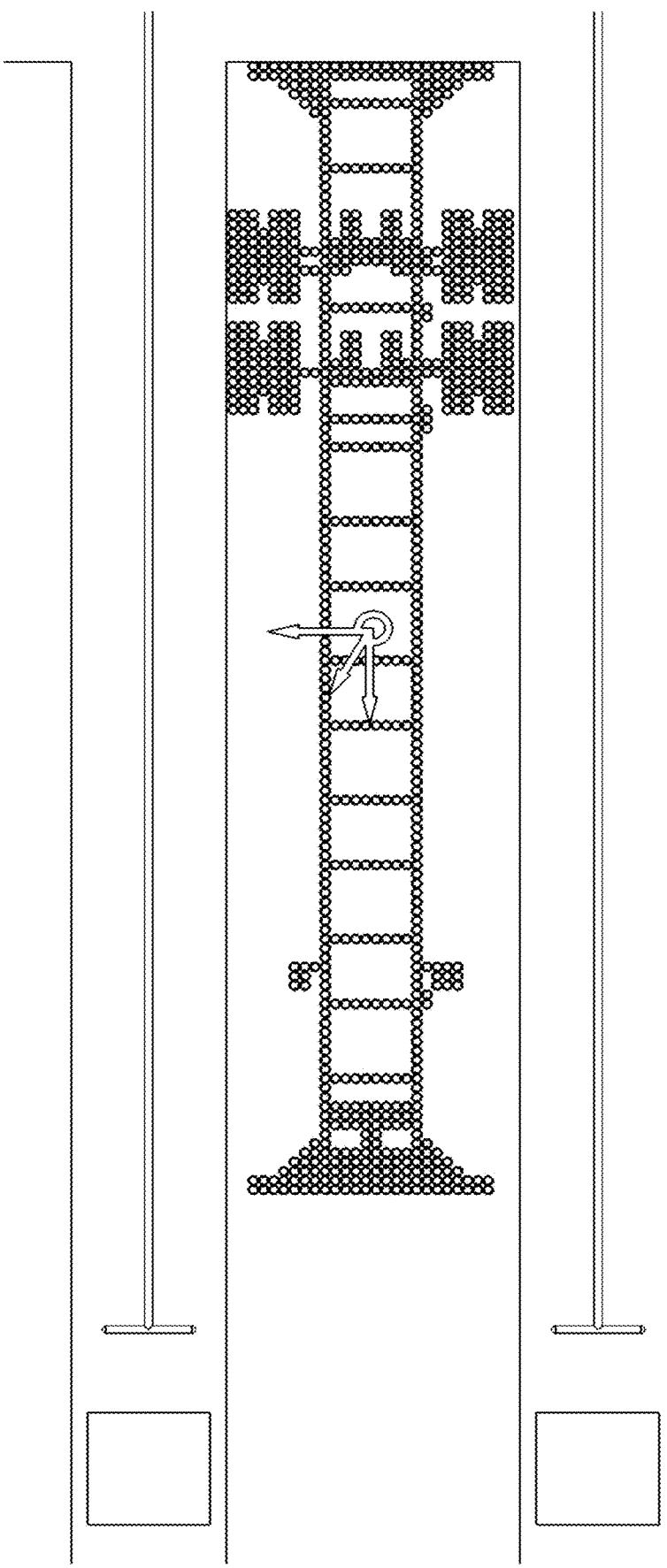
FIG. 32 is a diagram of a Model Cloud at Expected Position according to an embodiment of the invention.

In embodiments, by using the potentially low-quality set of measurement points of the current landing surface with a model of the chassis, which was made and obtained prior to this step, the system can determine where exactly on this chassis to land a container by using well studied methods of comparing the position and orientation of two similar objects. The system begins with a rough guess of where the chassis is located under the crane. Typically, this rough guess of the current chassis location is provided from an external system (Terminal Operating System—TOS) that has a catalog of the current operation and its presumed location in the crane's coordinate system, FIG. 31 shows the typical expected position of a chassis in a lane. To start the algorithm, the model cloud will be placed at this expected position as in FIG. 32.

Figure 33:
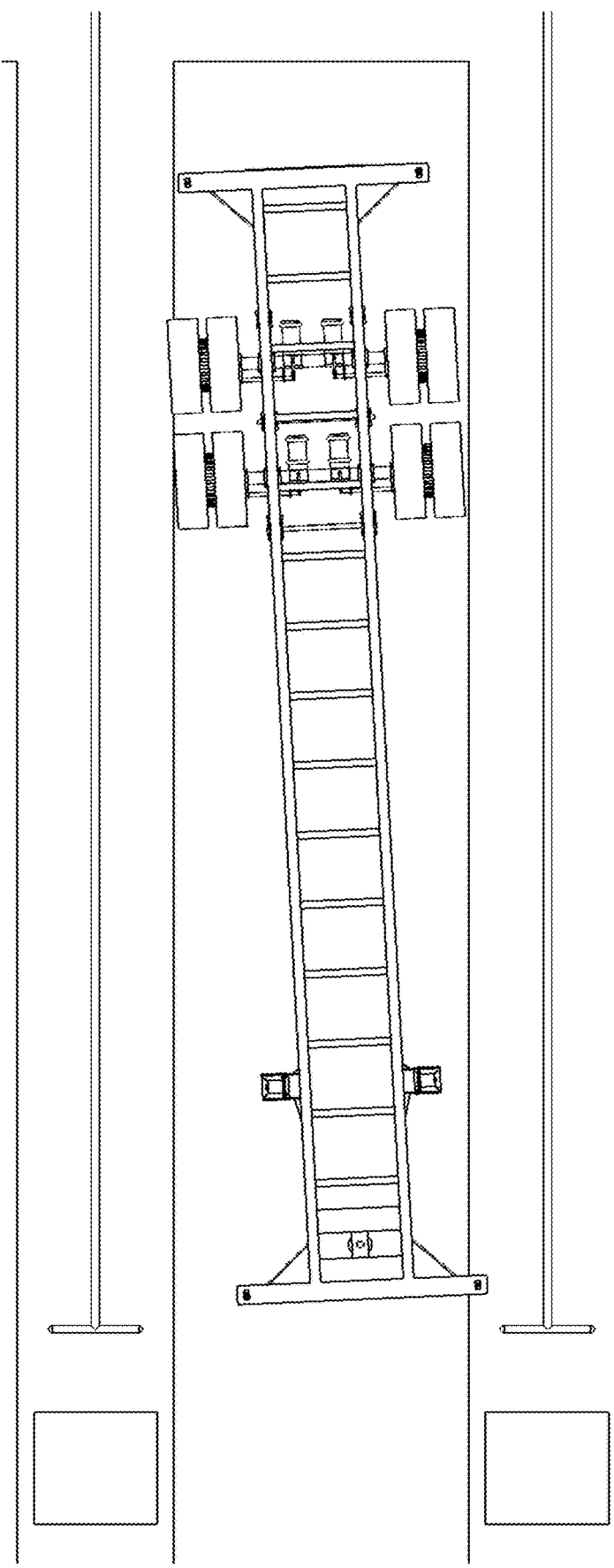
FIG. 33 is a diagram of an Actual Chassis Position in Lane according to an embodiment of the invention.
Figures 34A, 34B:
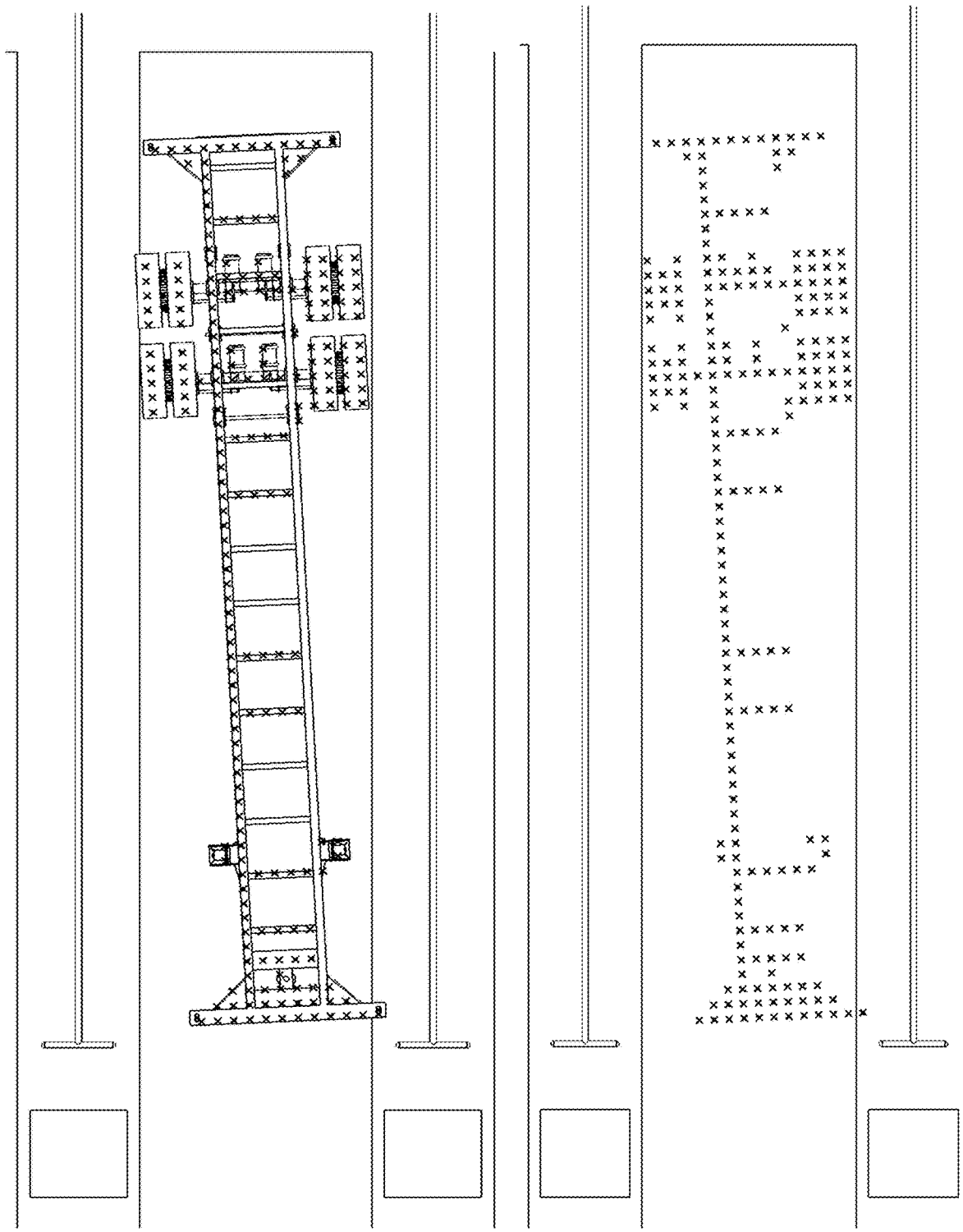
FIGS. 34A-B are diagrams showing Data Sampled from Actual Chassis Parked in Lane according to an embodiment of the invention.
Figure 35:
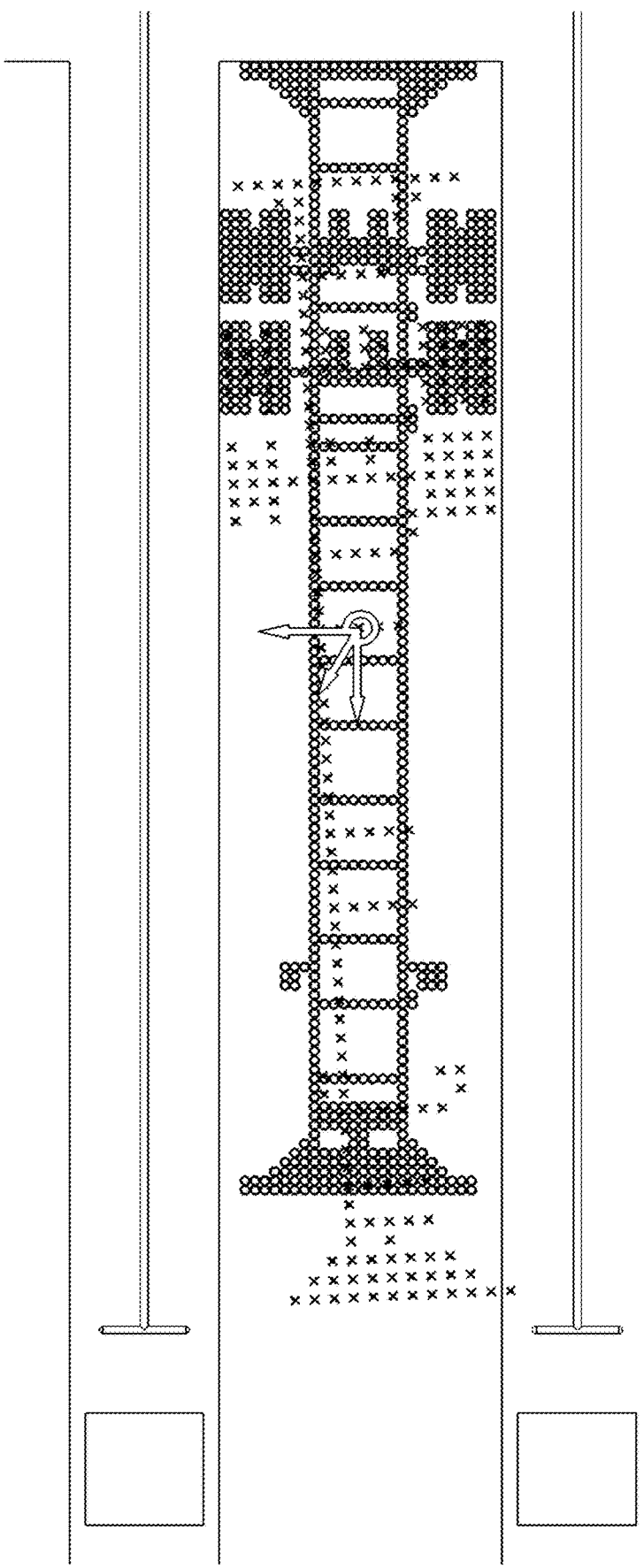
FIG. 35 is a diagram of a Model Cloud at Ideal Location and Current Data Cloud at Actual Position according to an embodiment of the invention.

According to embodiments, the system then attempts to generate a more accurate but still coarse guess of where to place the container near this location. The coarse guess is obtained from filtering noisy data corresponding to the current chassis data cloud to only the chassis landing surface and taking the average of the max and min measurement points of the filtered chassis point cloud to obtain the center of the landing surface. FIG. 33 shows how a chassis may actually be parked in the lane. FIGS. 34A-B show how this parked chassis may generate a current data cloud. FIG. 35 shows the initial miss-alignment between the model cloud at the ideal position, and the actual data cloud at the true position.

Figure 36:
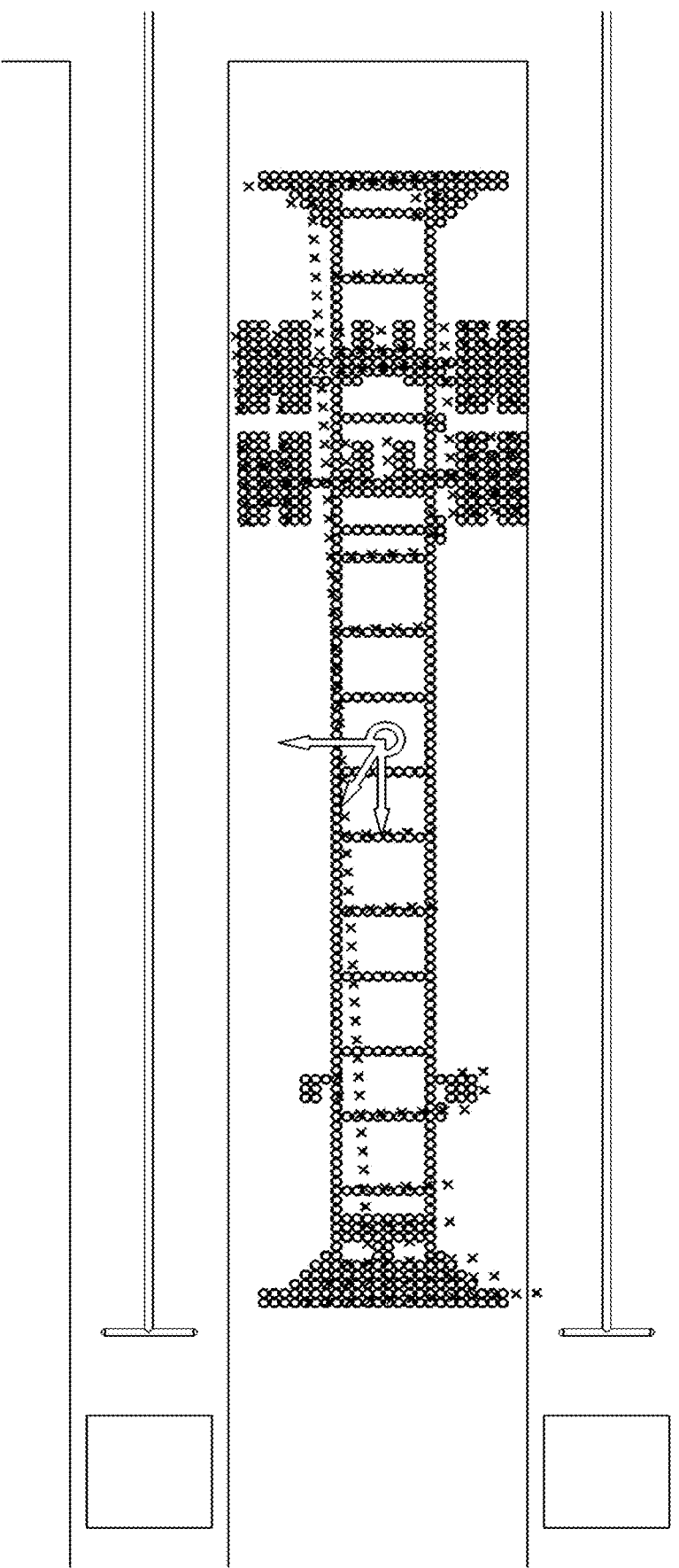
FIG. 36 is a diagram showing an Initial Coarse Alignment of Model Cloud and Actual Cloud according to an embodiment of the invention.

In embodiments, once the system has a coarse guess of the location of the landing surface, the system then orients the model of the landing surface such that its origin, the landing position in the model for the center of the largest container which the chassis supports, is aligned with this center of the current chassis. FIG. 36 shows the initial coarse alignment of the ideal model cloud and the actual data cloud by roughly aligning their centers. The alignment of the model at this phase will be somewhat poor, but will serve as a good starting point for the remainder of the process.

In embodiments, after this coarse alignment, the system will have two collections of measurement points representing the chassis, current points and model points, which are approximately aligned in the crane's operating frame of reference. The system now attempts to produce a fine alignment for the two objects using a method in which to obtain a more precise alignment of the two items. The concept of taking two views of the same object, or in this case two point clouds of the same object, and finding a transform which best aligns them is a well-studied problem in computer vision and 3D data processing. There are many different methods for aligning these two clouds. One such algorithm that can be used is the Iterative Closest Point (ICP) algorithm. (see Besl, Paul J.; N. D. McKay (1992). "A Method for Registration of 3-D Shapes." *IEEE Trans. on Pattern Analysis and Machine Intelligence*. Los Alamitos, CA, USA: IEEE Computer Society. 14 (2): 239-256).

According to embodiments, this algorithm takes two approximately aligned data sets and for each point in set A it will try to find a corresponding point in set B. Correspondences are usually determined by finding the closest point as determined by their Cartesian distance. This generates a set of correspondences between the points in set A and set B. Once correspondences are generated a new position estimate can be generated which more precisely aligns the points in each set by attempting to minimize the distances between all correspondences. Once the distances are minimized, a new alignment is generated, and another set of correspondences is found. This process is repeated until the position change becomes sufficiently small. At this point the most precise alignment has been achieved and the iterative process is finished.

Figure 37:
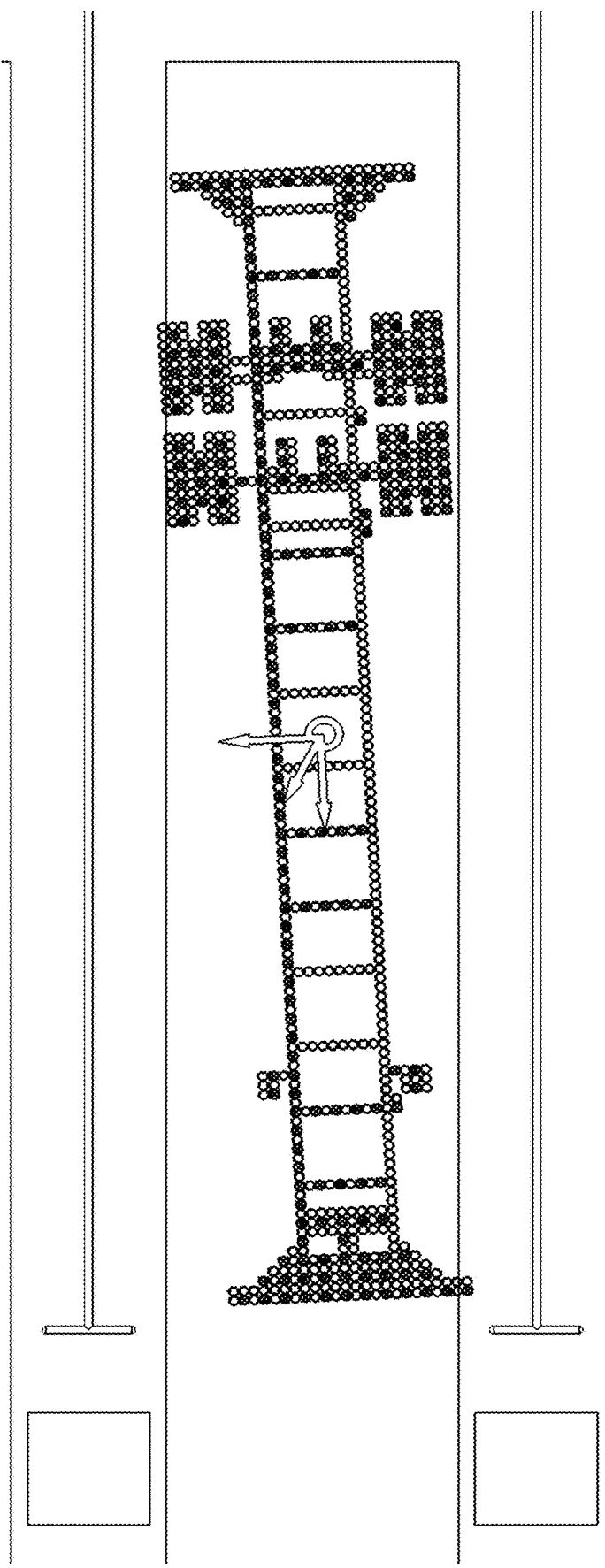
FIG. 37 is a diagram showing Final Alignment after ICP (iterative closest point) according to an embodiment of the invention.

According to embodiments, by employing ICP and the stored chassis model, the system can generate a very accurate positioning of the model cloud over the current chassis cloud in the crane's operating frame of reference as in FIG. 37.

In embodiments, since the local origin of the model cloud represents the landing position of the largest container which the model landing surface can support, and there exists offsets from that position to any other containers that the surface can support, the system now has the landing position and orientation, in crane coordinates, of where to place any container on the current chassis because the system has positioned the model chassis identically to the current chassis through the usage of ICP. The outputs of the system are the translation in XYZ coordinates and rotations about XYZ axes which best align the two models. By positioning the container at the target XYZ coordinate with the given orientation the container will mate with the chassis at the desired location.

Example: The Need for Landside Automation in Automated Terminals

Increasing ship size and consolidation of shipping lines has made the competition among container terminals extremely fierce. Over the last decade alone, vessel sizes have nearly doubled from an average capacity less than 4,000 Twenty-foot Equivalent Unit (TEU) in 2008 to current averages up to 13,772 TEU for Asia-North Europe trade routes. The world's largest vessel is capable of holding 21,413 TEU and there are 57 ultra-large container ships each with at least 18,000 TEU capacities currently on order. Additionally, environmental impact is a growing concern all over the world, with increasing regulations and the drive to lower emissions. If container terminals want to attract larger vessels and maintain their competitive edge, they must improve terminal throughput and efficiency while reducing their carbon footprint. Landside automation provides a tangible solution for achieving these goals.

Automation has been evolving in the container industry over the last 20 years. Automatic Stacking Cranes (ASC) began appearing in the early 2000s and revolutionized container yard layout and operations. Ideally, ASC yards are oriented perpendicular to the quay with a Waterside Transfer Zone (WSTZ), a stacking area, and a Landside Transfer Zone (LSTZ). The WSTZ serves as the exchange area between the quay and the stacking area, and is typically serviced by either straddle carriers or Automatic Guided Vehicles (AGV). These vehicles drop off the container in the WSTZ. The ASC can automatically pick up and drop off containers in these areas once the vehicles have left. The stacking area is an unmanned area where the ASCs operate in full automatic mode. The LSTZ is where containers are loaded onto road trucks for transport. Traditionally, these ASCs only allow full automatic operation inside of unmanned areas (WSTZ and stacking area) and rely on remote operators to complete all moves in the LSTZ. While this method offers many improvements over a purely manual operation, its reliance on remote operators for all moves in the LSTZ introduces delays in the transfer process.

Operators rely on various camera views in order to accurately position and land a container on a road chassis from a remote location. These remote operators bring human variability to the landing process. Some operators are very efficient, while others require more time or multiple attempts to achieve a successful container pick-up or landing.

Another delay is introduced from waiting for a remote operator to become available to perform the move. In one of the world's most advanced container terminals, the average wait time for a remote operator to connect to a waiting crane is approximately 33 seconds. This connection time seems very impressive when evaluated for a single container move. However, over the course of a 24-hour period the 33-second delay is a significant loss of productivity. This wait time adds up to 2.1 hours per crane and over 50 hours a day of wasted productivity depending on the size of the yard. These wait times only include the time waiting for an operator to become available and do not include any time the operator takes to perform the move once they are connected. Implementing a successful automation solution in the LSTZ greatly improves terminal productivity.

Figure 38A:
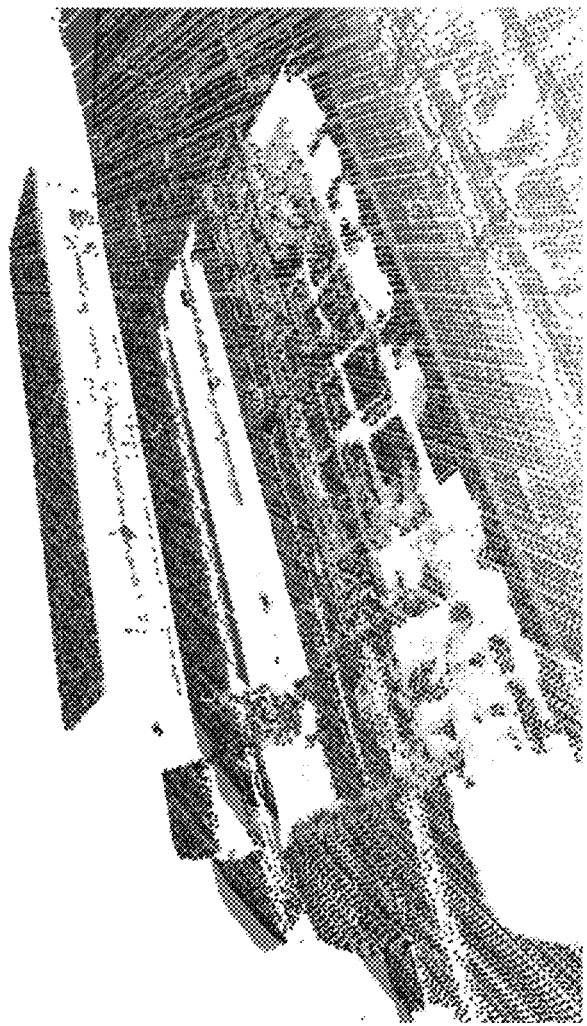
FIGS. 38A and 38B are renderings showing raw (FIG. 38A) and filtered (FIG. 38B) data for a chassis loaded with twin twenties according to embodiments of the invention.
Figure 38B:
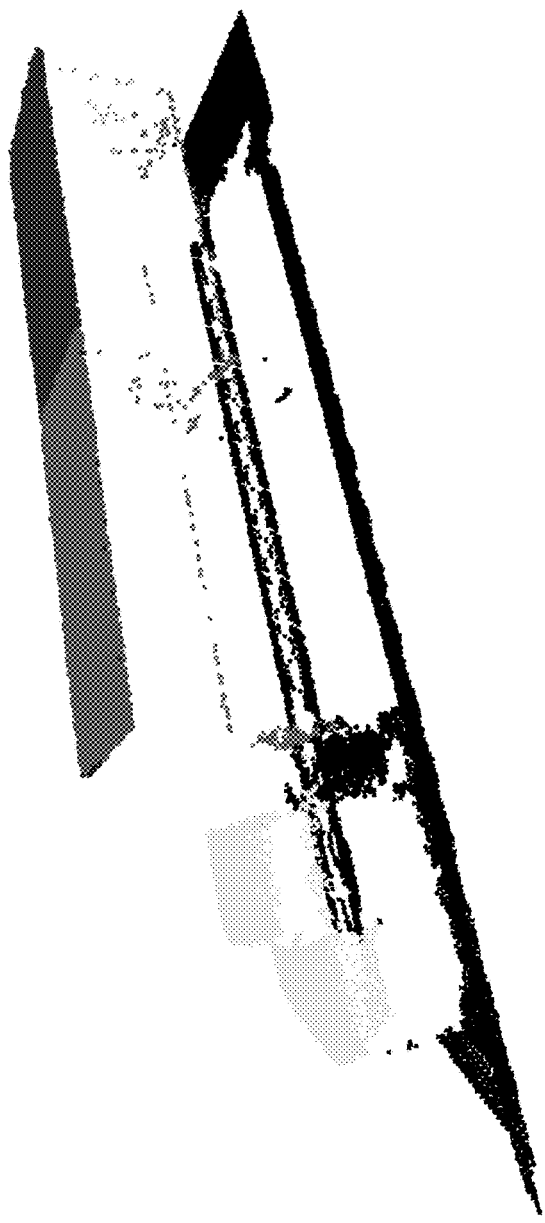

Embodiments of the present invention provide a new system providing fully autonomous landing on any top loaded container handling equipment, including road chassis. This system utilizes the same sensors required for a traditional ASC and usually does not require any additional infrastructure. Furthermore, it provides an economical solution either for new ASCs or to retrofit existing ASCs. The system uses crane-mounted laser scanners (LIDAR) to create a model of the area under the spreader. As the ASC enters the LSTZ, it begins a scan of the area underneath the crane generating a set of Cartesian coordinates in the crane's frame of reference. Collecting these points over time creates a point cloud representing the area of interest. Filtering the raw point cloud provides a clear view of the target. FIGS. 38A and B show both raw (FIG. 38A) and filtered (FIG. 38B) point cloud data of a loaded chassis. The filtered data provides a precise location of the container that the crane will use to autonomously remove the container from the chassis and transport the container to the stacking area.

Automating the process of landing containers on road chassis presents significantly more challenges than the pickups discussed above. The inherent variability between different chassis types, the required 25 mm combined accuracy for the twistlocks, and the resolution capabilities of crane-mounted scanners are the main obstacles. Embodiments of the present invention provide a new LSTZ automation solution which addresses these issues by analyzing chassis geometry and shape instead of attempting to "see" twistlocks to determine an appropriate landing solution. Point cloud data for the empty chassis is constructed as previously described, and the system then evaluates key geometric features to determine the correct loading position of the container and deposits the container on the empty chassis. FIGS. 39A-F show scan data from several different chassis types.

This system has achieved great success in the locations where it is currently in operation. It has an average success rate of 99% for automated pickups from the chassis, a 70% success rate for automated landing on chassis, for a combined success rate of 84.5% for landside-automated operations. This system offers significant improvements in efficiency and success rates. The system generates a solution in approximately 3 seconds following scan completion. The total time required to land on a road chassis is 66 seconds from the time the crane enters the LSTZ to the time when the spreader is completely disengaged from the container.

A landside automation system such as this one reduces the average wait time in the LSTZ from 33 seconds waiting for a remote operator to 3 seconds for the system to generate an appropriate solution in 84.5% of all operations. This is an extra 1.66 hours of production per crane every day without considering any improvements in the active landing time. Additionally, in the instances where an operator must intervene, that involvement usually consists of a simple adjustment in the landing position which takes significantly less time to complete than a fully remote move.

Another benefit of autonomous landings in the LSTZ is the near elimination of hard landings. The auto landing system will accurately detect the height of the chassis and slow down appropriately prior to landing. This reduces damage and maintenance of the spreader and increases overall crane up time.

Finally, an effective landside automation system reduces the overall emissions of the terminal. The average truck uses approximately 3.1 L (0.82 gal) of fuel for every hour spent idling. An extra 30 seconds of wait time is not significant to an individual truck driver and it does not provide a practical incentive for turning the truck off while waiting. However, on the terminal level, these extra waits can add up to an extra 50 hours of truck idling emissions per day. With the described LSTZ automation system, idling time is reduced by 38 hours/day eliminating up to 312 kg of $CO_2$ and 5.47 kg of $NOx$ emissions, every day. Automating the LSTZ is an essential step in improving environmental factors as well as helping container terminals keep up with the ever-increasing vessel size, meeting increased throughput requirements, and to remaining competitive in the global marketplace.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. Methods disclosed can be used with systems disclosed or other known systems, while systems disclosed can be used with methods disclosed or other known methods. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in the invention are each individually incorporated by reference herein in their entireties and as such are intended to provide an efficient way of supplementing the enabling disclosure of this invention as well as provide background detailing the level of ordinary skill in the art.

The invention claimed is:

1. A method of identifying a landing position on target equipment or a chassis for an object or container according to the position and orientation of the target equipment or chassis, the method comprising:

obtaining a point cloud model of a current target equipment or chassis landing surface which is disposed in a frame of reference of a crane;

aligning a point cloud model of a reference target equipment or chassis landing surface with the point cloud model of the current target equipment or chassis landing surface, within a selected degree of matching, wherein the aligning comprises weighted matching of identifying features of the current target equipment or chassis landing surface and of the reference target equipment or chassis landing surface with adaptive learning compensation;

wherein the aligning comprises positioning the reference target equipment or chassis landing surface at an expected position and orientation in the frame of reference of the crane; and producing a set of coordinates in the frame of reference as a result of the aligning, which coordinates represent a landing position for placing the object or container on the landing surface of the current target equipment or chassis.

2. The method of claim 1, wherein the adaptive learning compensation involves storing the point cloud model of the current target equipment or chassis landing surface as an additional reference target equipment or chassis landing surface to enable improved matching for the analyzing of subsequent target equipment or chassis landing surfaces.

3. A method of identifying a landing position on target equipment or a chassis for an object or container according to the position and orientation of the target equipment or chassis, the method comprising:

obtaining a point cloud model of a current target equipment or chassis landing surface which is disposed in a frame of reference of a crane;

aligning a point cloud model of a reference target equipment or chassis landing surface with the point cloud model of the current target equipment or chassis landing surface, within a selected degree of matching, wherein the aligning comprises weighted matching of identifying features of the current target equipment or chassis landing surface and of the reference target equipment or chassis landing surface with adaptive learning compensation;

wherein the aligning comprises:

determining a first center of the landing surface of the current target equipment or chassis within the current target equipment or chassis point cloud model;

determining a second center of the landing surface of the reference target equipment or chassis within the reference target equipment or chassis point cloud model;

obtaining a course alignment by aligning the first and second centers;

obtaining a fine alignment by iteratively minimizing distances between corresponding points in the current chassis point cloud model and points in the reference chassis point cloud model to arrive at the fine alignment; and producing a set of coordinates in the frame of reference as a result of the aligning, which coordinates represent a landing position for placing the object or container on the landing surface of the current target equipment or chassis.

4. The method of claim 3, wherein iteratively minimizing the distances involves an iterative closest point (ICP) algorithm.

5. The method of claim 3, wherein the adaptive learning compensation involves storing the point cloud model of the current target equipment or chassis landing surface as an additional reference target equipment or chassis landing surface to enable improved matching for the analyzing of subsequent target equipment or chassis landing surfaces.

6. A method of identifying a type of target equipment or chassis capable of holding an object or container, the method comprising:

obtaining a point cloud model of a current target equipment or chassis landing surface; and i) comparing the point cloud model of the current target equipment or chassis landing surface to one or more reference target equipment or chassis landing surfaces to identify which reference target equipment or chassis landing surface matches the current target equipment or chassis landing surface within a selected degree of matching; and ii) using a neural network and a sample of reference target equipment or chassis landing surfaces to teach the neural network what is a matching target equipment or chassis cloud.

7. The method of claim 6, wherein the comparison involves comparing metadata obtained from the point cloud model of the current target equipment or chassis landing surface and one or more of the point cloud models of the reference target equipment or chassis landing surfaces.

8. The method of claim 7, wherein the metadata is obtained from a voxel filter.

9. The method of claim 6, wherein the comparing is performed to identify similarities or differences in surface characteristics between the current target equipment or chassis landing surface and one or more of the reference target equipment or chassis landing surfaces and/or between the current target equipment or chassis landing surface and a known target equipment or chassis landing surface.

10. The method of claim 6, further comprising analyzing the point cloud model of the current target equipment or chassis landing surface to identify a type of target equipment or chassis that the point cloud model of the current target equipment or chassis landing surface is associated with.

* * * * *